(12) United States Patent
Sicilia

(10) Patent No.: US 7,946,836 B2
(45) Date of Patent: May 24, 2011

(54) INJECTION MOLDING AND TEMPERATURE CONDITIONING APPARATUS

(75) Inventor: Roberto Sicilia, Mississauga (CA)

(73) Assignee: Roberto Sicilia, Mississauga, Ontario (CA)

( * ) Notice: Subject to any disclaimer, the term of this patent is extended or adjusted under 35 U.S.C. 154(b) by 211 days.

(21) Appl. No.: 12/454,809

(22) Filed: May 22, 2009

(65) Prior Publication Data

US 2009/0297648 A1 Dec. 3, 2009

Related U.S. Application Data

(60) Provisional application No. 61/055,649, filed on May 23, 2008.

(51) Int. Cl.
*B29C 45/42* (2006.01)
*B29C 45/72* (2006.01)

(52) U.S. Cl. .......................... 425/139; 425/444; 425/547

(58) Field of Classification Search .................. 425/139, 425/444, 528, 533, 534, 547, 556; 700/197, 700/200
See application file for complete search history.

(56) References Cited

U.S. PATENT DOCUMENTS

| | | |
|---|---|---|
| 3,488,801 A | 1/1970 | Hartely |
| 3,882,213 A | 5/1975 | Uhlig |
| 4,140,464 A | 2/1979 | Spurr |
| 4,197,073 A | 4/1980 | Rees |
| 4,209,290 A | 6/1980 | Rees |
| 4,313,720 A | 2/1982 | Spurr |
| 4,313,905 A * | 2/1982 | Hafele ........................... 264/532 |
| 4,356,142 A | 10/1982 | Germanio |
| 4,382,760 A * | 5/1983 | Wiatt et al. ................... 425/139 |
| 4,382,905 A | 5/1983 | Valyi |
| 4,435,146 A | 3/1984 | Wiatt et al. |
| 4,470,797 A | 9/1984 | Harry et al. |
| 4,588,370 A | 5/1986 | Ichizawa et al. |
| 4,592,719 A | 6/1986 | Bellehache et al. |
| 4,694,951 A | 9/1987 | Gibbemeyer |
| 4,721,452 A | 1/1988 | Delfer |
| 4,729,732 A | 3/1988 | Schad et al. |
| 4,786,455 A | 11/1988 | Krishnakumar et al. |
| 4,836,767 A | 6/1989 | Schad |
| RE33,237 E | 6/1990 | Delfer |
| 5,052,626 A | 10/1991 | Wood et al. |
| 5,114,327 A | 5/1992 | Williamson et al. |
| 5,139,724 A | 8/1992 | Hofstetter et al. |
| 5,206,039 A | 4/1993 | Valyi |
| 5,232,641 A | 8/1993 | Williamson et al. |
| 5,232,715 A | 8/1993 | Fukai |
| 5,447,426 A | 9/1995 | Gessner et al. |
| 5,501,593 A | 3/1996 | Marcus |
| 5,514,309 A | 5/1996 | Williamson et al. |
| 5,569,476 A | 10/1996 | van Manen et al. |
| 5,582,788 A | 12/1996 | Collette et al. |

(Continued)

*Primary Examiner* — Yogendra N Gupta
*Assistant Examiner* — Emmanuel S Luk

(57) ABSTRACT

An injection molding machine and a mold are used to form batches of hallow parts, such as PET preforms. An end of arm tool transfers the molded preforms from the mold to a temperature conditioning station having a conveyor. The batch of molded preforms is received and retained on the end of arm tool by an array of cooling tubes that are attached to a number of identical cooling tubes carrier devices. The conveyor is adapted to receive the carrier devices and the cooling tubes loaded with molded preforms from the end of arm tool. The conveyor is also adapted to transfer rapidly the carrier devices and the empty cooling tubes into the end of arm tool before the end of arm tool is moved back into the molding area to receive subsequent batches of molded preforms.

20 Claims, 22 Drawing Sheets

U.S. PATENT DOCUMENTS

| | | | |
|---|---|---|---|
| 5,589,130 A | 12/1996 | Takada et al. | |
| 5,653,934 A | 8/1997 | Brun et al. | |
| 5,702,734 A | 12/1997 | Hartman et al. | |
| 5,707,662 A | 1/1998 | Bright et al. | |
| 5,762,982 A * | 6/1998 | Knepper et al. | 425/526 |
| 5,772,951 A | 6/1998 | Coxhead | |
| 5,876,768 A * | 3/1999 | Collombin | 425/174.4 |
| 6,095,788 A | 8/2000 | van Manen et al. | |
| 6,123,538 A | 9/2000 | Kutalowski | |
| 6,139,789 A | 10/2000 | Neter | |
| 6,143,225 A | 11/2000 | Domodossola et al. | |
| 6,156,258 A | 12/2000 | Takada et al. | |
| 6,290,891 B1 | 9/2001 | Galt | |
| 6,299,431 B1 | 10/2001 | Neter | |
| 6,299,804 B1 | 10/2001 | Domodossola | |
| 6,422,379 B1 | 7/2002 | Zoppas | |
| 6,428,304 B1 | 8/2002 | Sartor et al. | |
| 6,488,878 B1 | 12/2002 | Neter et al. | |
| 6,520,765 B2 | 2/2003 | van Manen | |
| 6,663,813 B2 | 12/2003 | Neter | |
| 6,837,662 B2 | 1/2005 | Rommes | |
| 6,942,480 B2 * | 9/2005 | Drysdale et al. | 425/526 |
| 7,077,641 B2 | 7/2006 | Hirasawatsu et al. | |
| 7,094,377 B2 | 8/2006 | Coran | |
| 7,128,553 B2 | 10/2006 | Shakal | |
| 7,261,547 B2 | 8/2007 | Romanski | |
| 7,264,463 B2 | 9/2007 | Domodossola | |
| 7,632,089 B2 | 12/2009 | Bates et al. | |
| 7,857,614 B2 * | 12/2010 | Di Simone | 425/528 |
| 2001/0038866 A1 * | 11/2001 | Giacobbe | 425/526 |
| 2003/0091681 A1 * | 5/2003 | Drysdale et al. | 425/445 |
| 2004/0115302 A1 * | 6/2004 | Rommes et al. | 425/526 |
| 2005/0048159 A1 * | 3/2005 | Hirasawatsu et al. | 425/528 |
| 2006/0138696 A1 | 6/2006 | Weinmann | |
| 2006/0279023 A1 * | 12/2006 | Walsh | 264/328.1 |
| 2010/0025188 A1 * | 2/2010 | Lanfranchi | 198/377.08 |

* cited by examiner

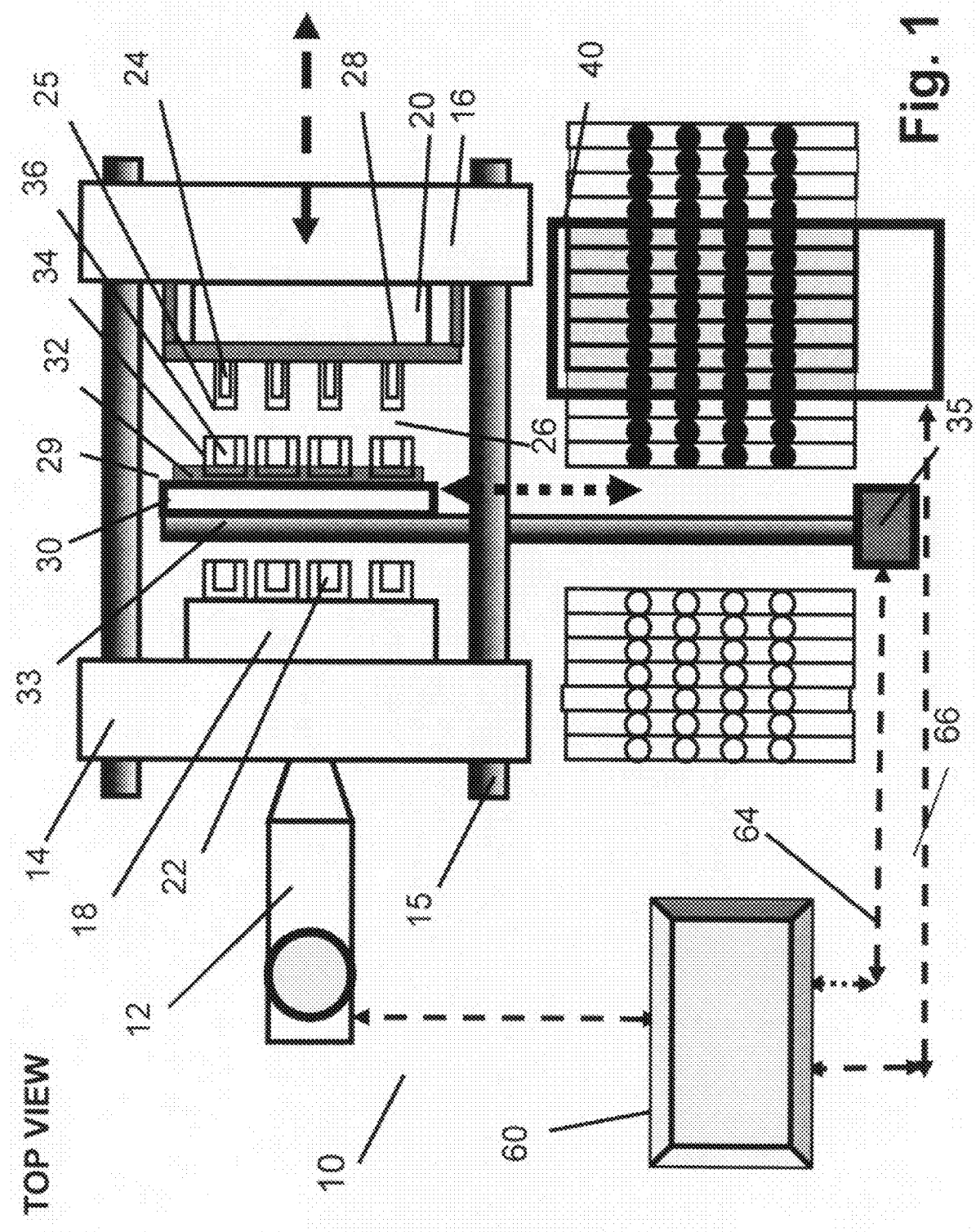

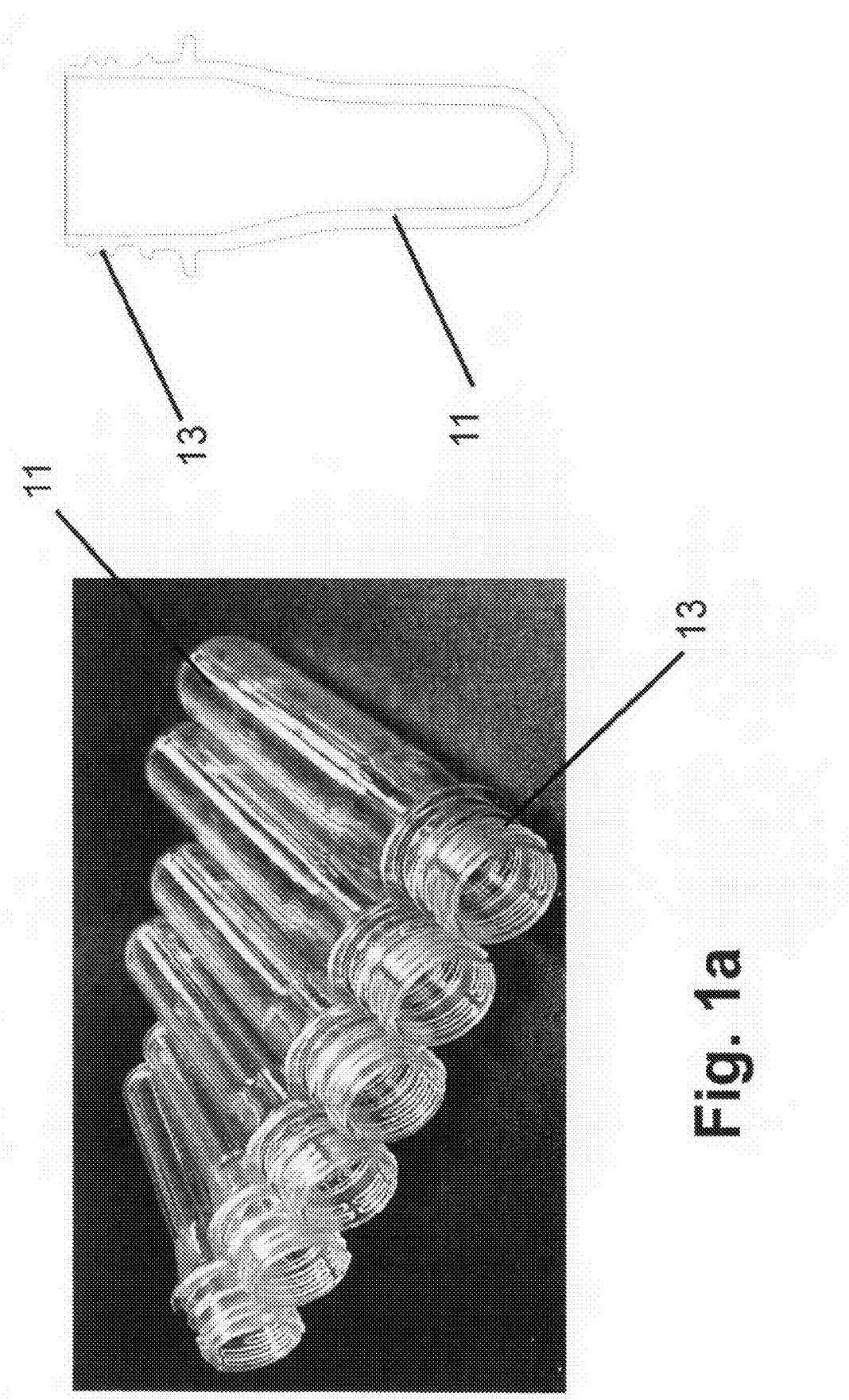

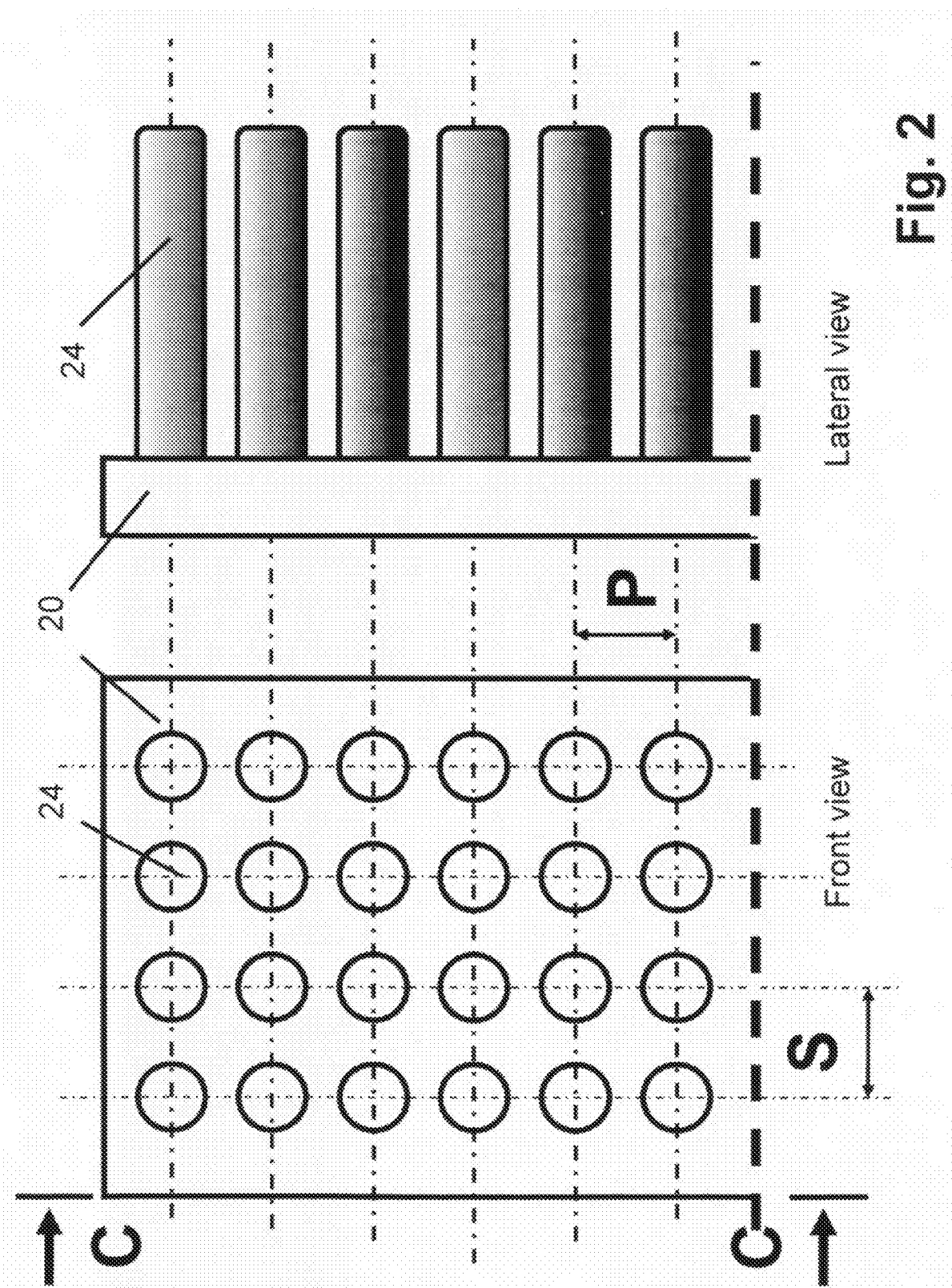

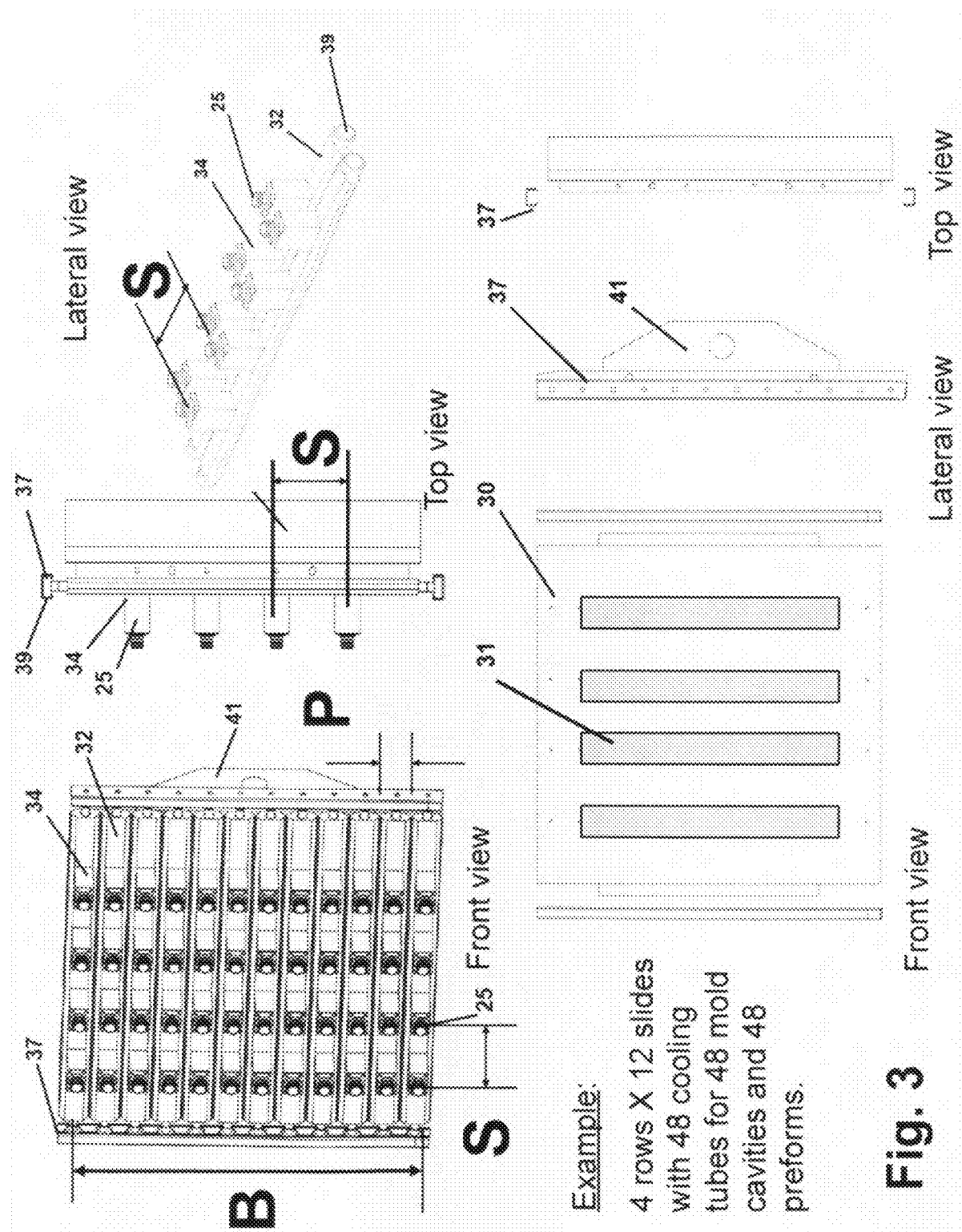

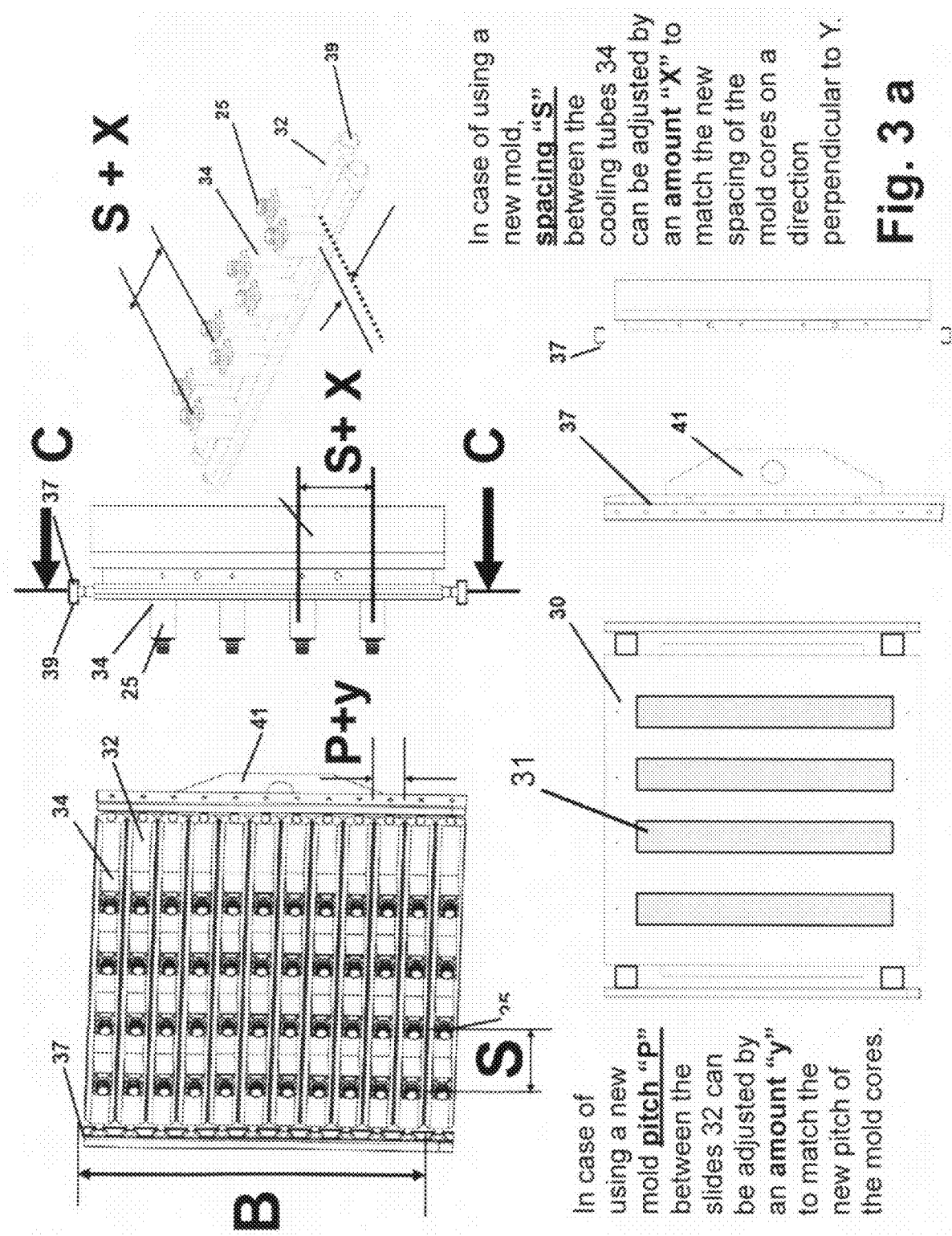

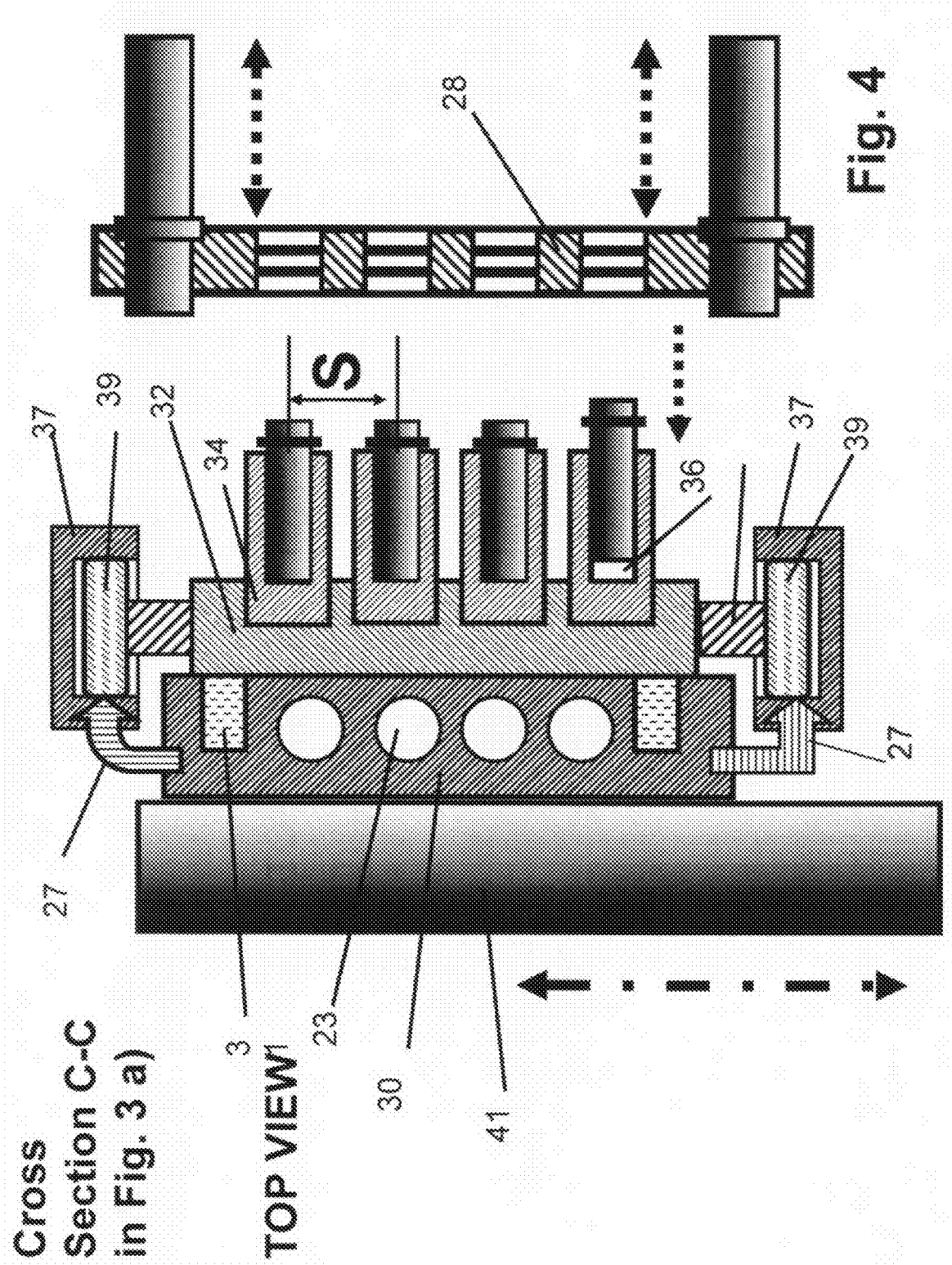

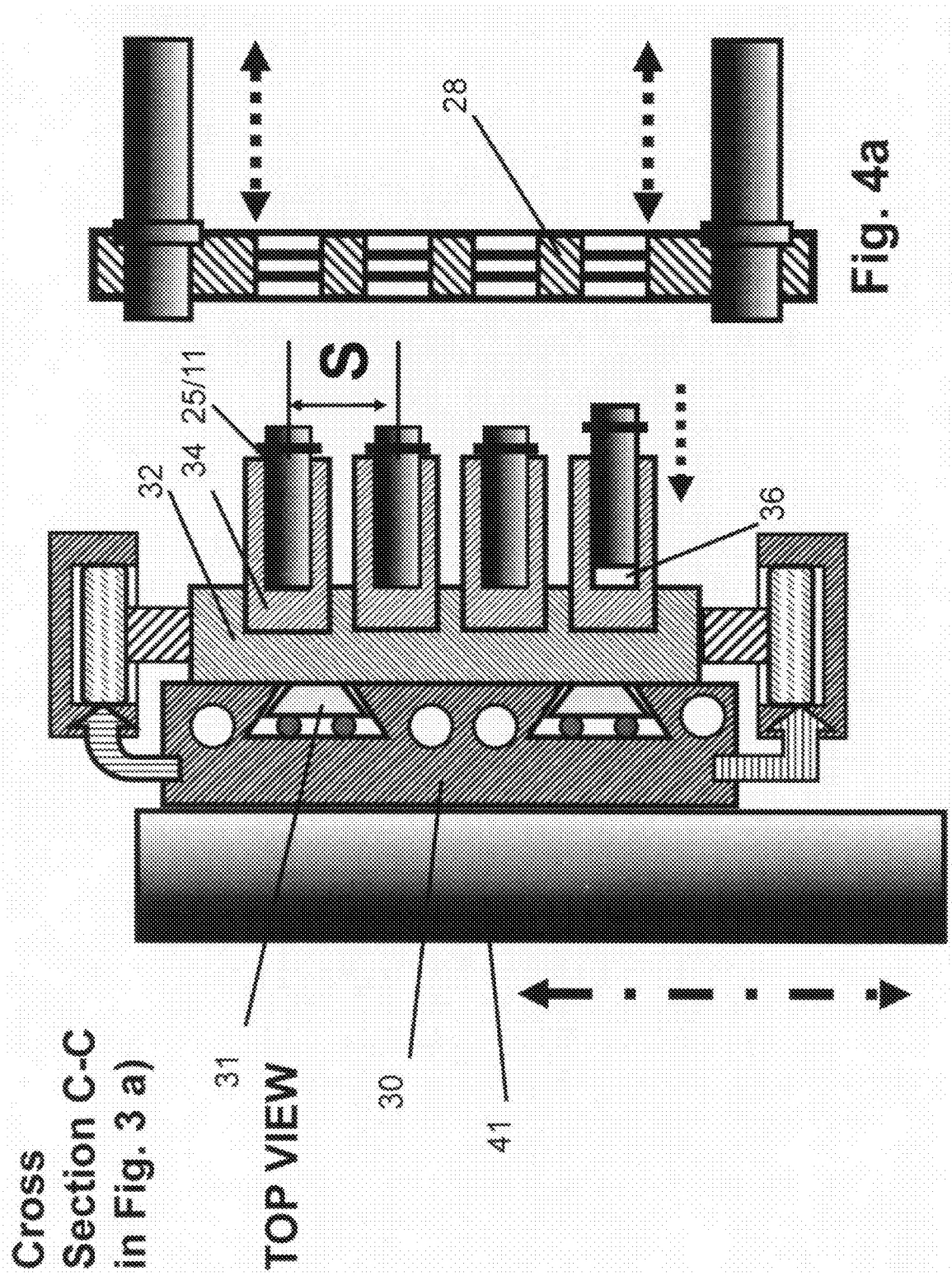

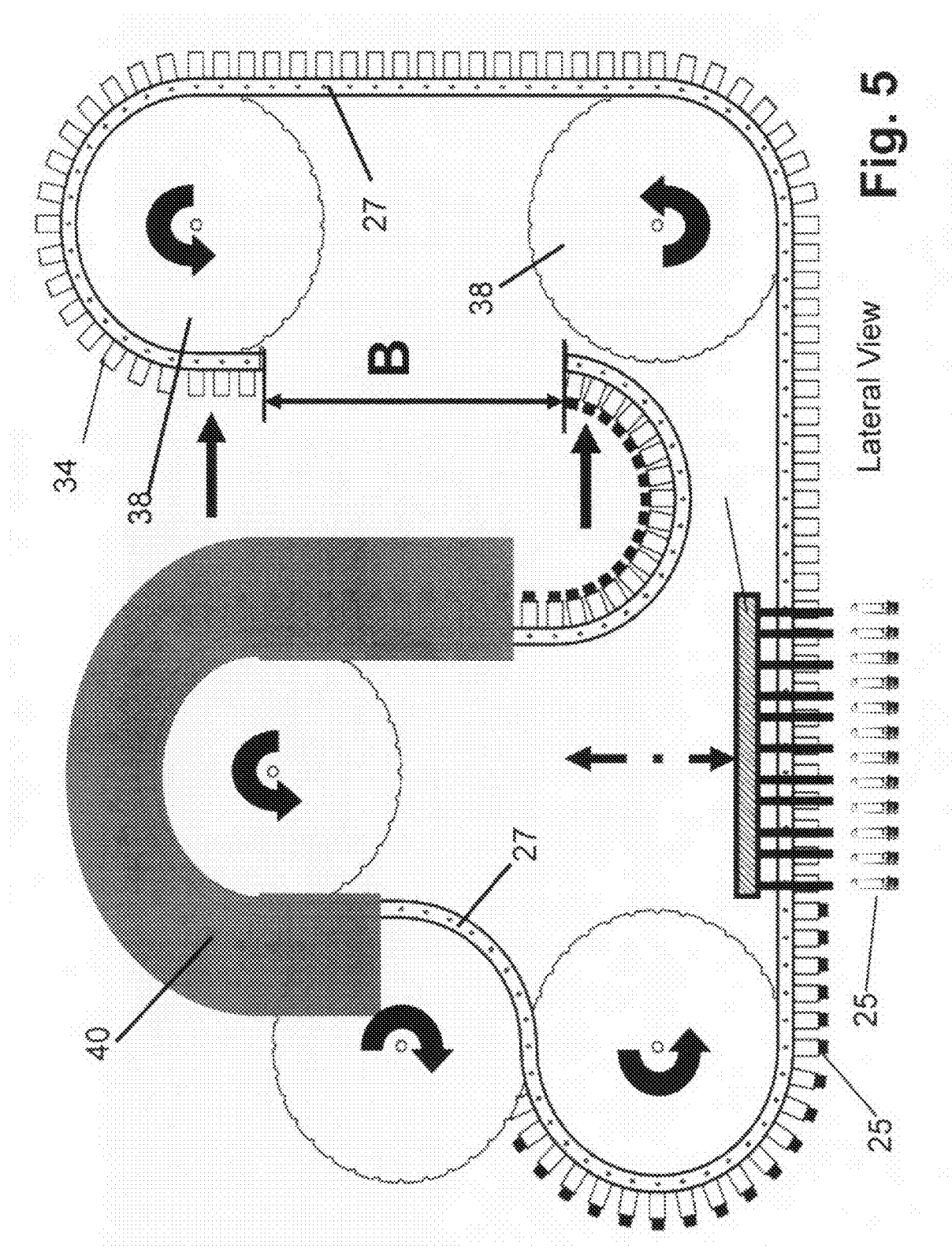

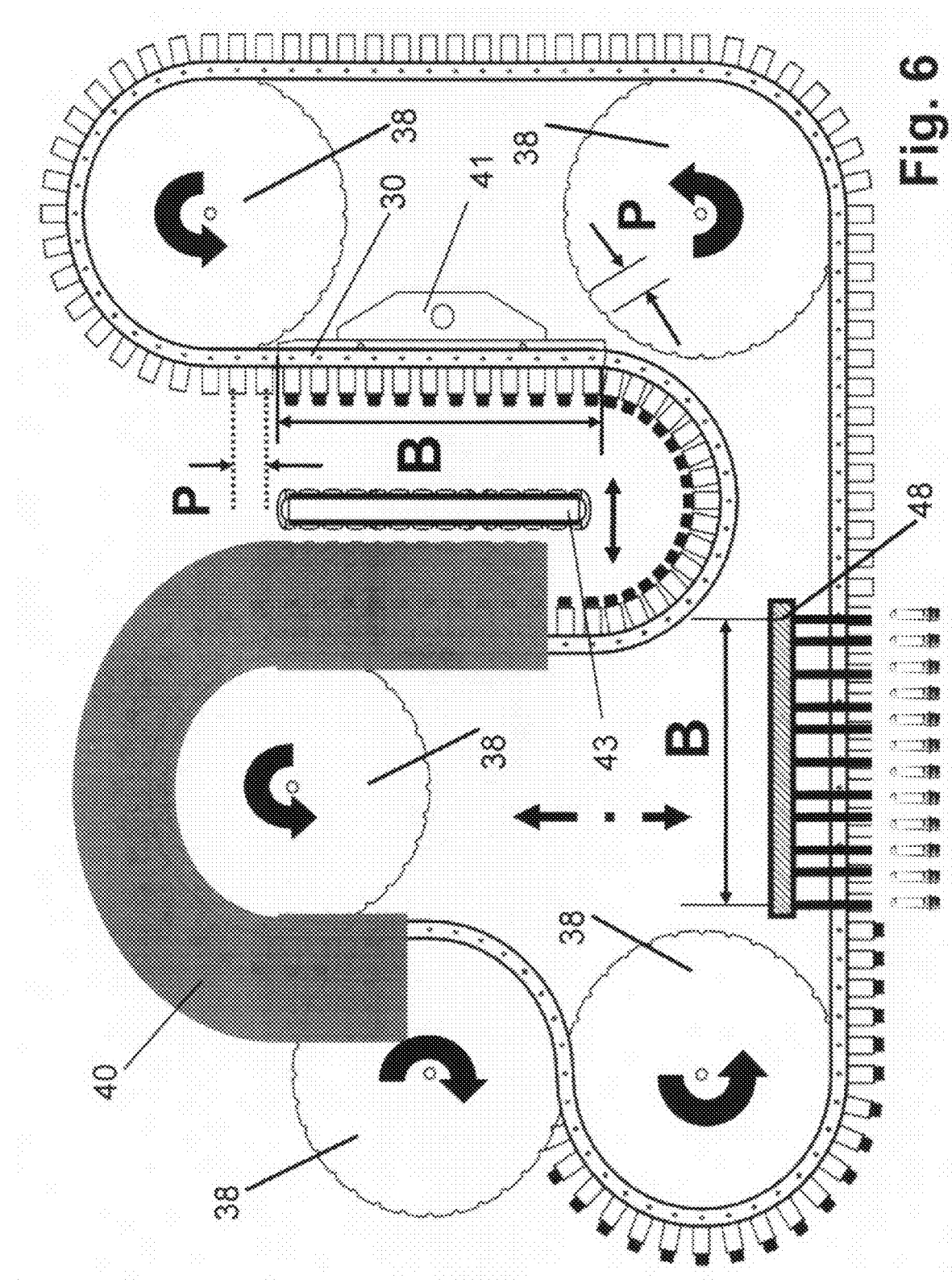

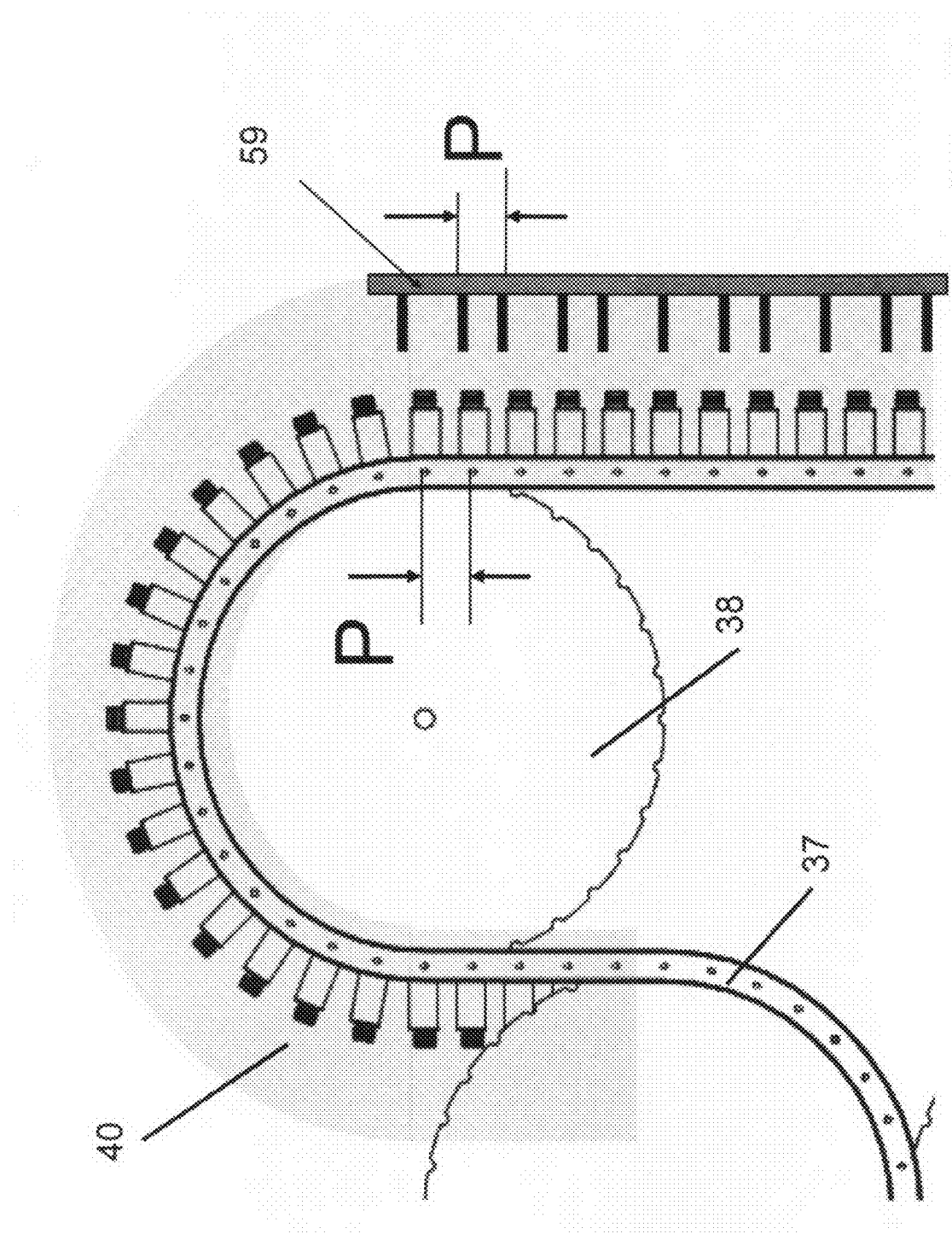

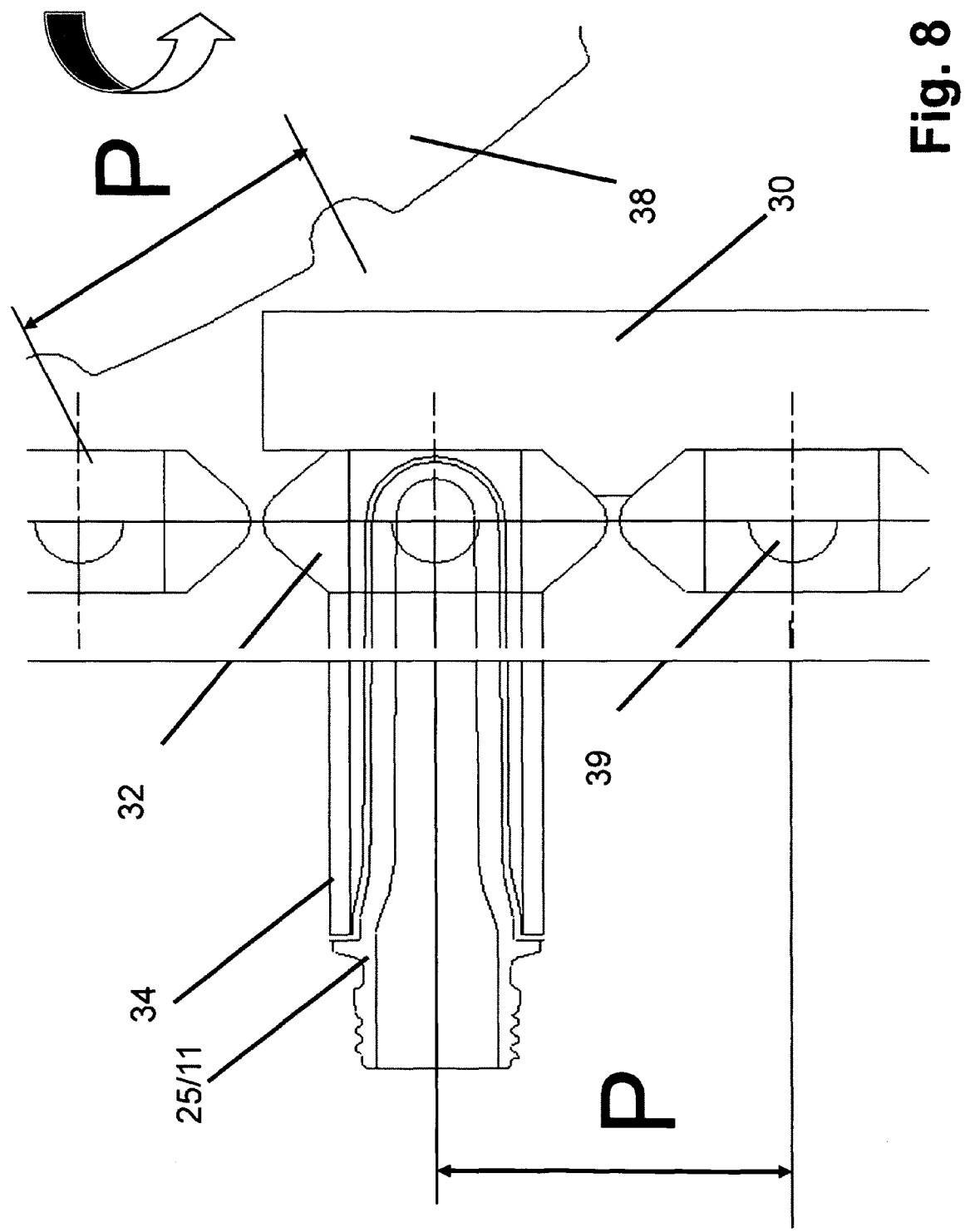

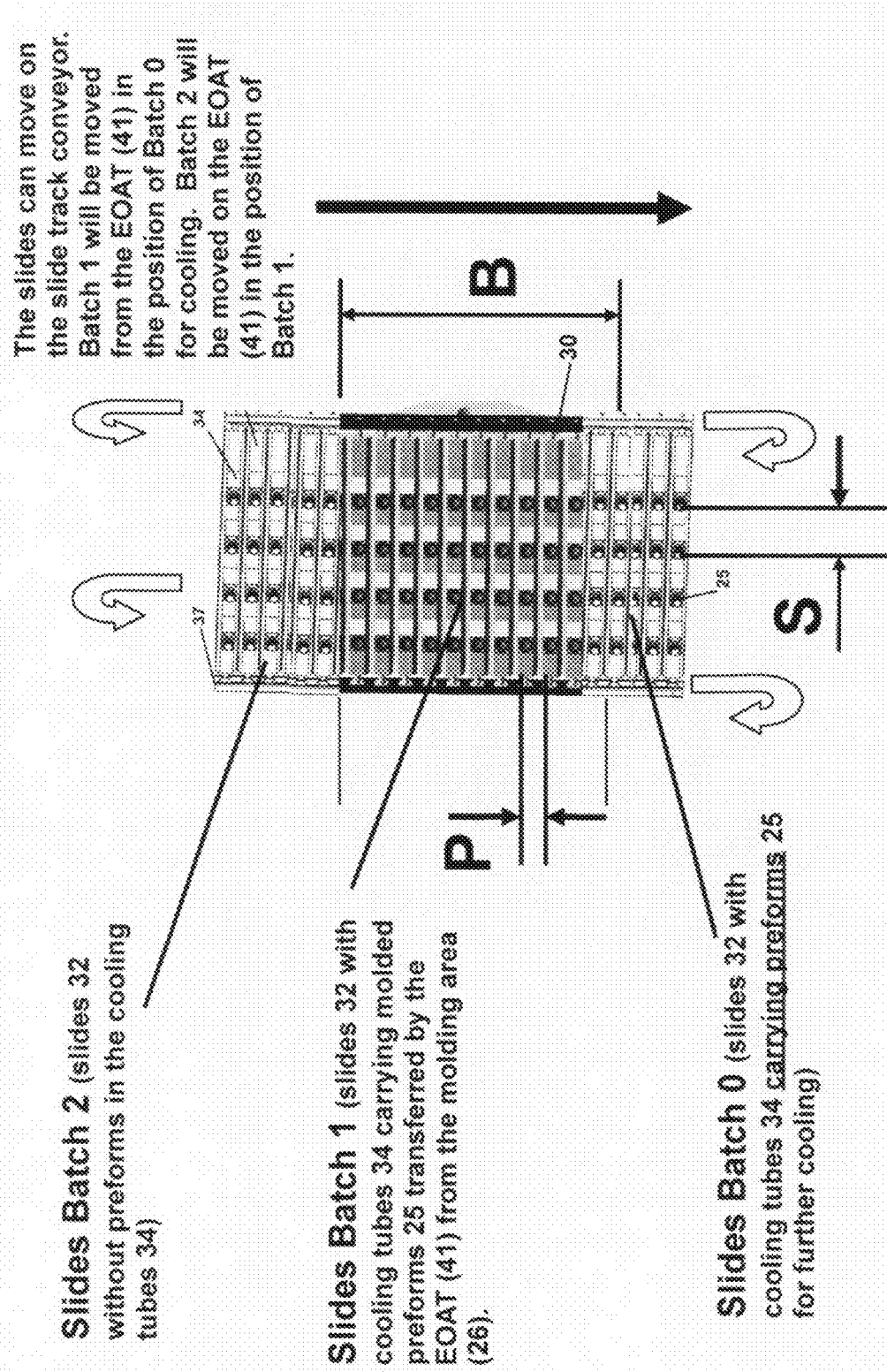

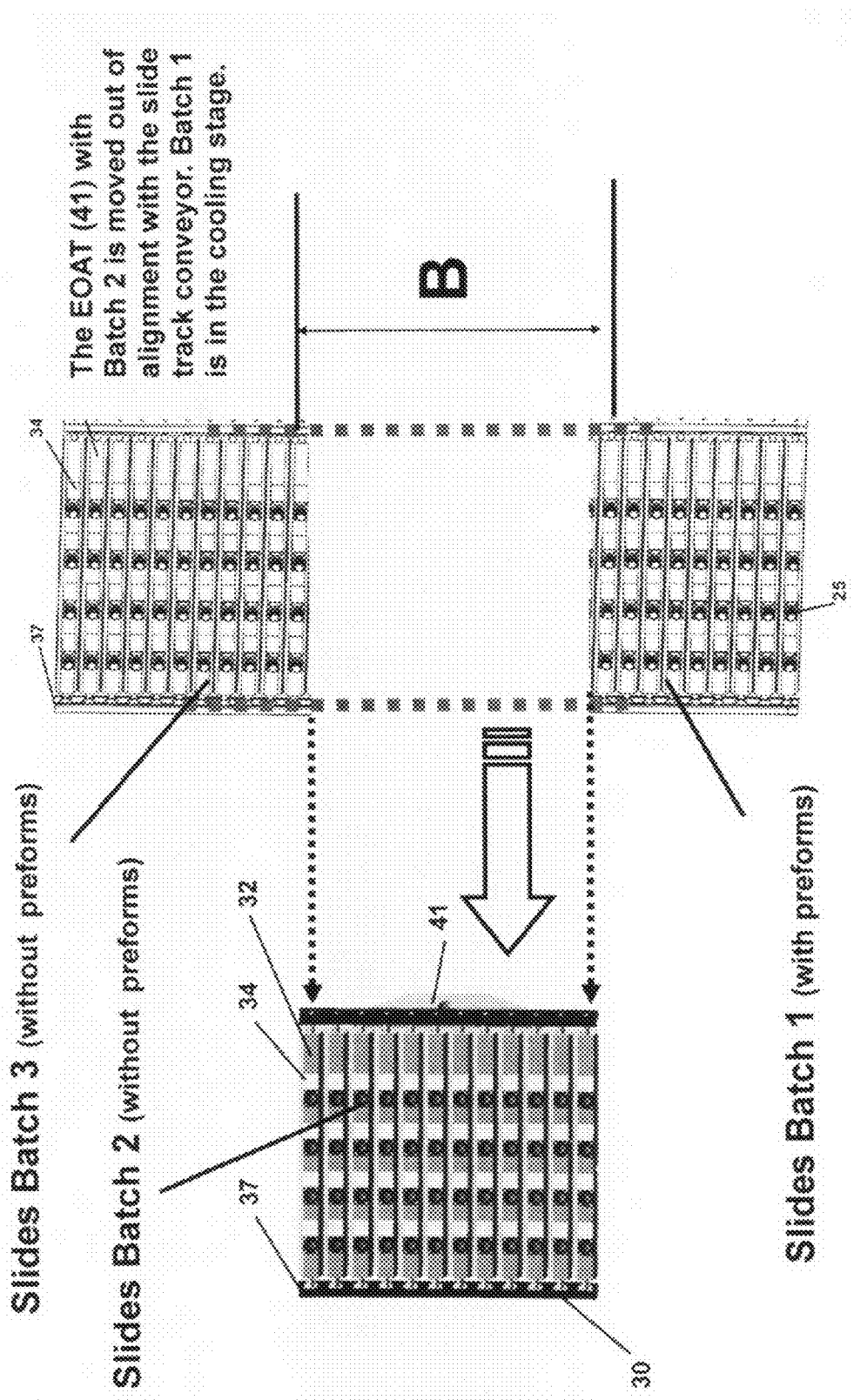

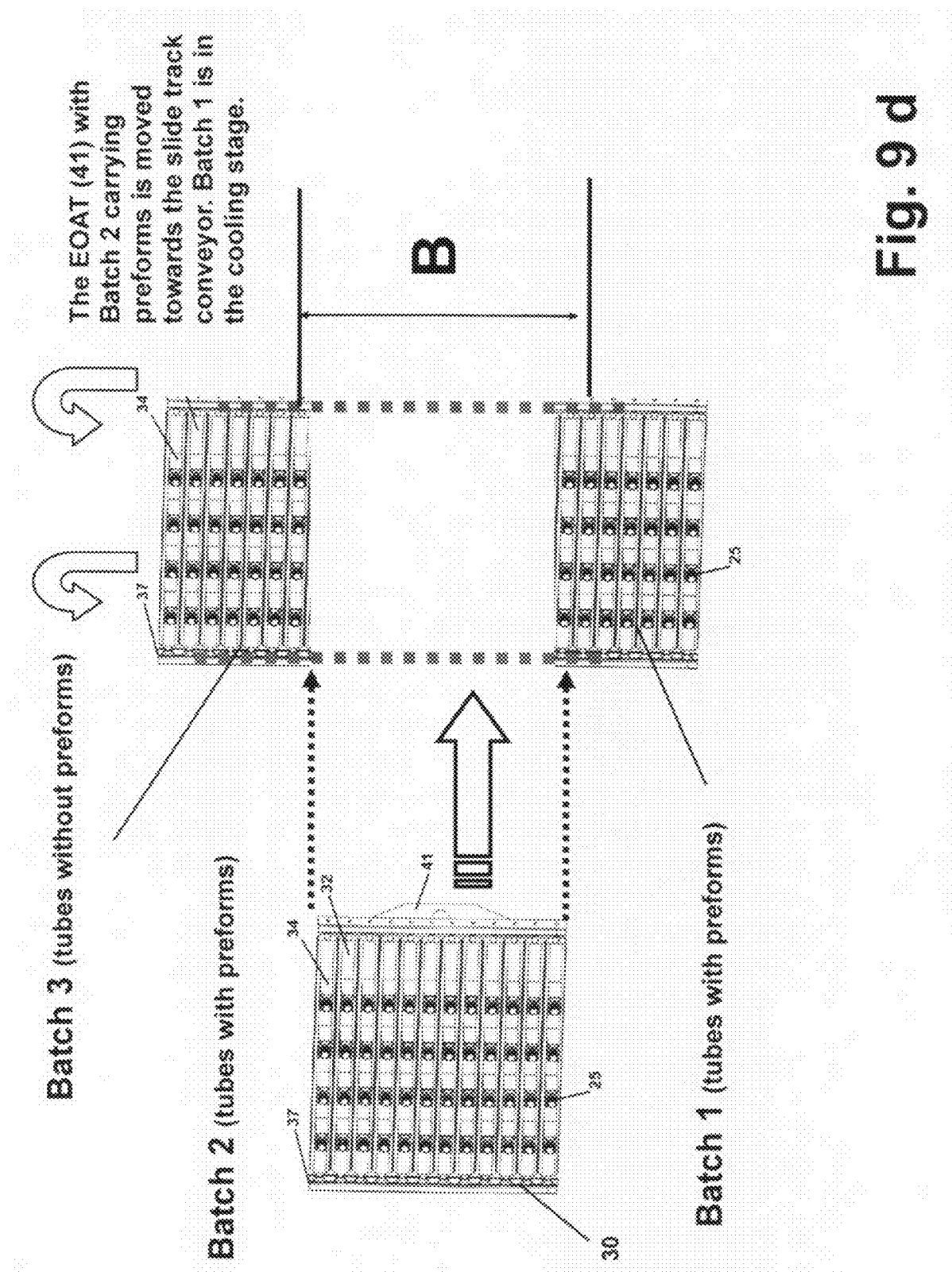

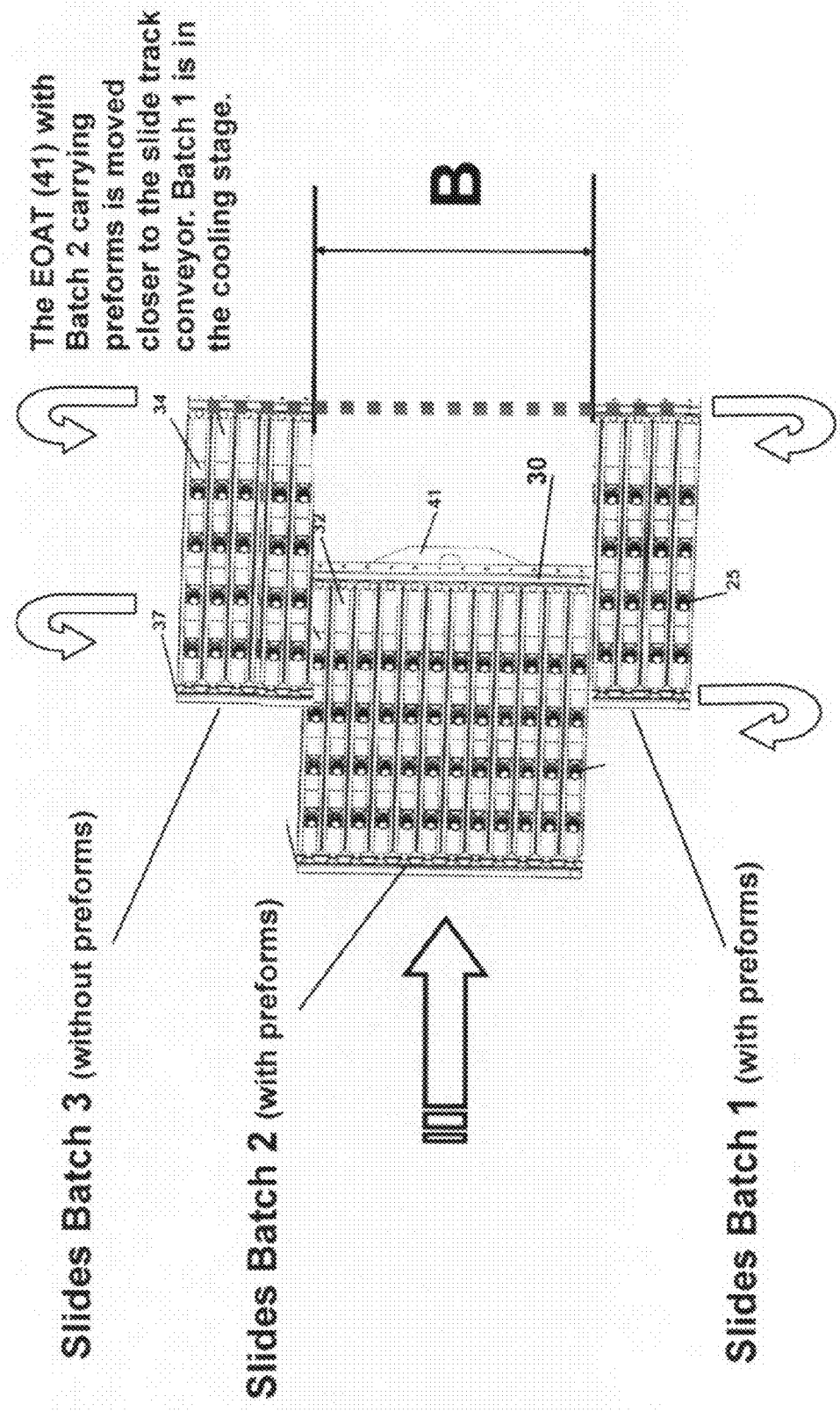

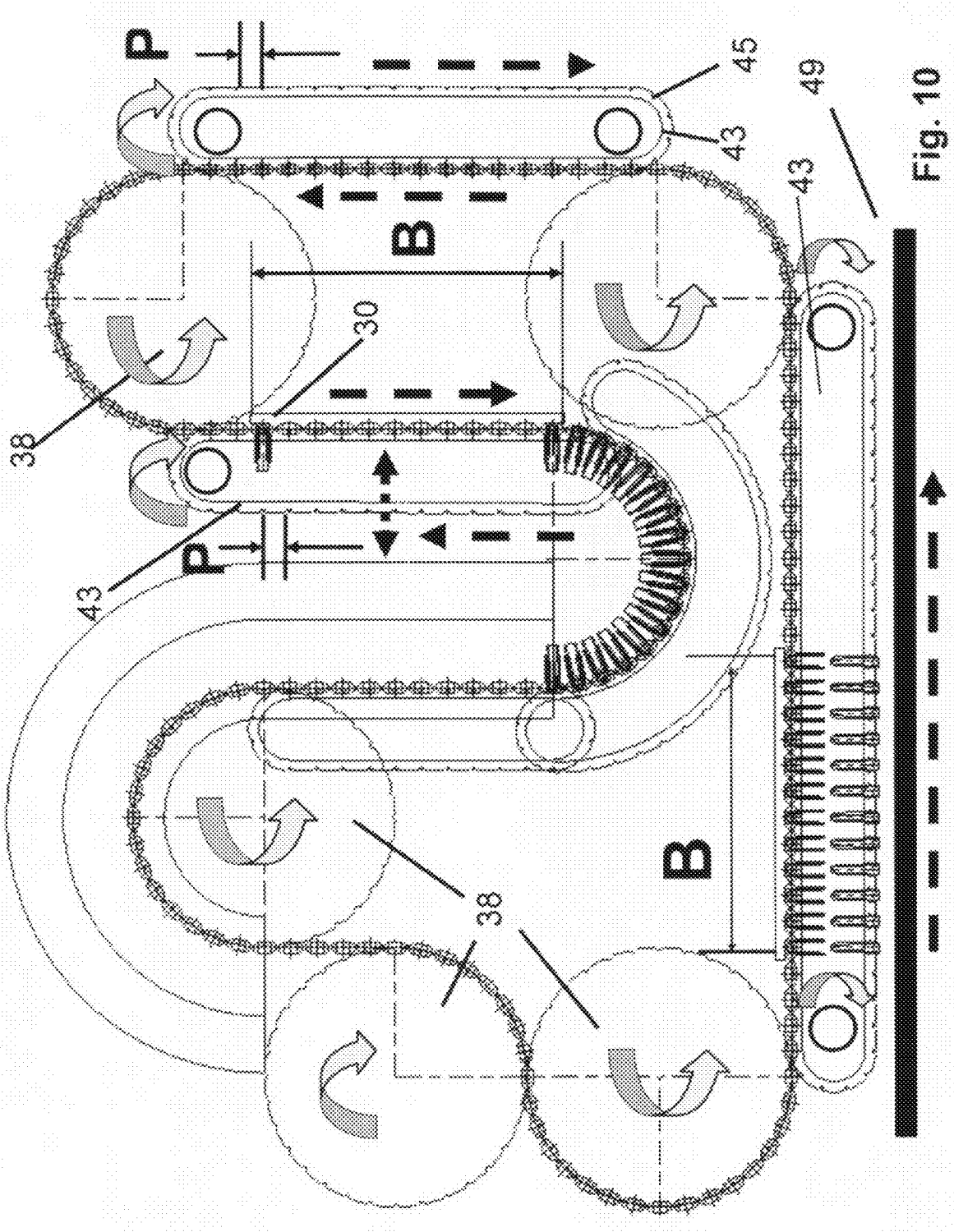

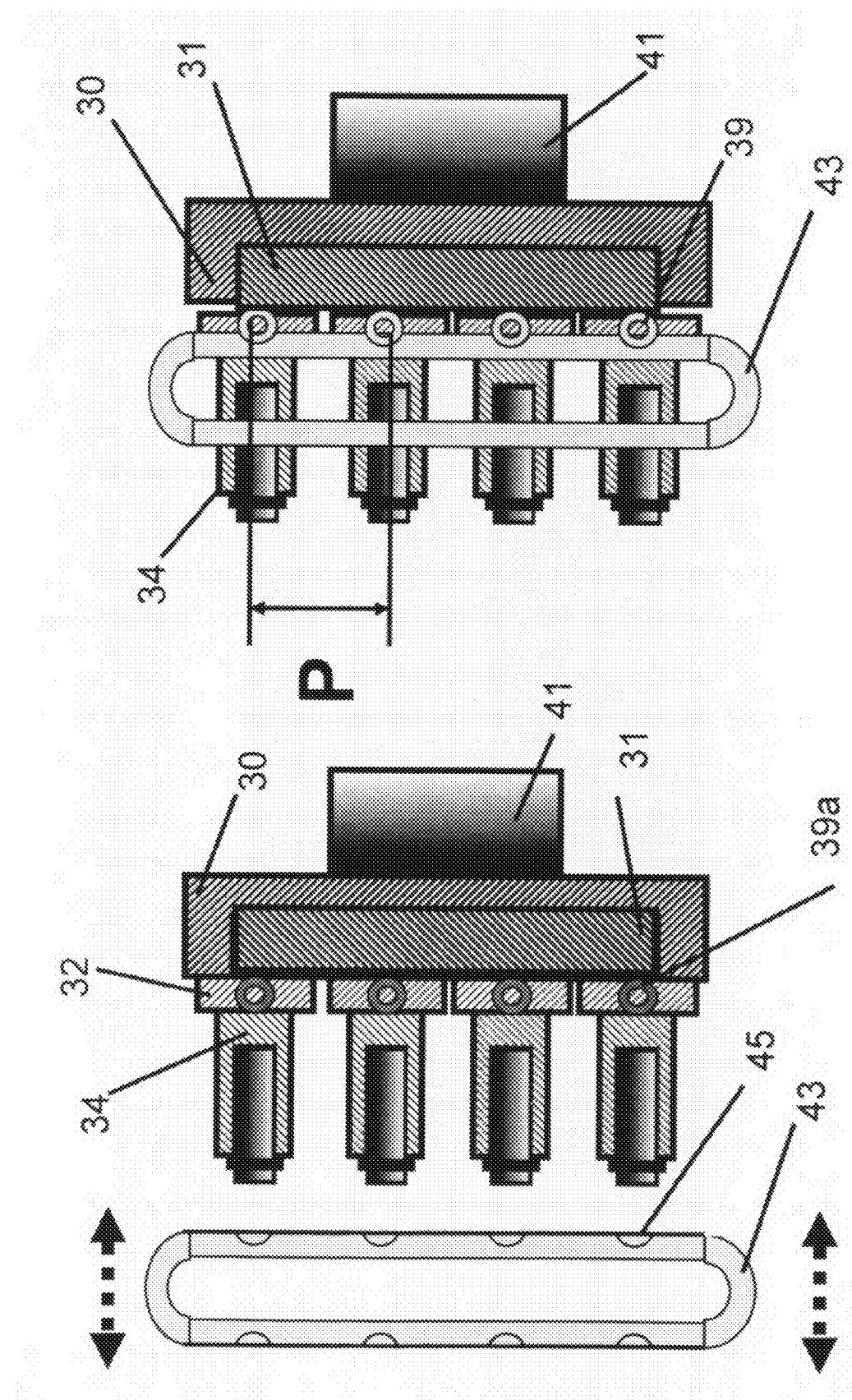

INJECTION MOLDING AND TEMPERATURE CONDITIONING APPARATUS

CROSS REFERENCE TO RELATED APPLICATIONS

This application claims the benefits of U.S. Provisional Patent Application No. 61/055,649 filed May 23, 2008 which is incorporated by reference here in.

FIELD OF THE INVENTION

Example embodiments of the present invention relate to injection molding of plastic articles and more particularly to an apparatus and a method of injection molding including the steps of removing, handling and temperature conditioning of hollow molded articles.

BACKGROUND OF THE INVENTION

Injection molding of hollow parts such as PET preforms or parisons, and further blow molding them are well known and documented techniques. In many instances these parts are manufactured using molding machines that incorporate specialized robots also called "end of arm tools" or "take out plates". They remove the molded preforms/parisons from the molding area and transfer them to a post mold temperature conditioning station prior to the blow molding stages.

It is desirable to have an injection molding system where all the components work together in a manner that increases the output of molded parts per system (i.e. a faster cycle time) without increasing the number of the injection molding cavities.

One known option to increase the output of molded preforms (i.e. reduce the cycle time) is to reduce the cooling time of the molded preforms as they solidify in the mold cavities, but this has some limits. The reduction of the cooling time in the mold can be compensated in some instances through additional and immediate cooling of the PET preforms as they are removed and transferred from the mold cavities to other stations of the injection molding system. This approach presents several challenges considering that PET is a highly sensitive material to processing parameters, especially to temperature and the cooling conditions during and after the injection molded stages.

PET, Poly(ethylene terephthalate) is a semicrystalline polyester commonly used in packaging and fiber applications. It has a glass transition temperature of 76° C., a melting temperature of 250° C., an amorphous density at 25° C. of 1.33 g/cm$^3$, a crystalline density at 25° C. of 1.50 g/cm$^3$ and a molecular weight of repeat unit of 192.2 g/mol. The processing temperature of PET is 280-300° C. (536-572° F.). PET exists both as an amorphous (transparent) and as a semi-crystalline (opaque and white) thermoplastic material. Generally, it has good resistance to mineral oils, solvents and acids but not to bases. Semi-crystalline PET has good strength, ductility, stiffness and hardness. Amorphous PET has better ductility but less stiffness and hardness. As polyethylene terephthalate provides an excellent barrier against oxygen and carbon dioxide, PET has become a material of choice for bottling beverages, such as mineral water and carbonated soft drinks.

There are two basic methods to form containers using molded preforms, one-step and two-step. In the two-step process, two separate machines are used—one for injection molding and the other for stretch-blow molding. In the first step the first machine injection molds the preform. The preform looks like a test tube, with bottle-cap threads already molded into place. The body of the tube is significantly thicker, as it will be blow molded (inflated) into its final shape in the second step using stretch-blow molding methods. In the second step, the cold preforms are heated rapidly and then blown (inflated) against a two-part mold to form them into the final shape of the bottle.

Reference is made to patents that show various methods and equipment for injection molding, handling and cooling preforms and more specifically PET preforms. U.S. Pat. No. 4,140,464 to Spurr et al shows a machine system for continuous formation of molecularly oriented plastic bottles by blowing a heat-conditioned parison comprising a set number (N) of parison forming stations and a set but lesser number (N/X) of blowing stations, N/X being an integral fraction of N. A storage area is constructed and arranged between the parison forming and blowing stations. In the method of operation, N number of parisons are formed simultaneously at the parison forming stations, transferred to the storage area, and N/X of the parisons are sequentially withdrawn from the storage area and blown in the set number N/X of blowing stations. The temperature in the storage area is maintained within the temperature range suitable for blowing. Effective use is made of the blowing stations without loss of thermal energy from the parison forming stations.

U.S. Pat. No. 4,197,073 to Rees et al shows a vertical injection-molding machine with two overlapping operating injection molds produces two sets of eight parisons each in staggered operating cycles. Each set of parisons is transferred by a respective carrier assembly, immediately upon the opening of the respective injection mold, into the vicinity of a blow-molding unit with eight cells in which the parisons are inflated into bottles during half an injection cycle. The transfer from the closely spaced injection cavities to the blow-molding unit is performed by several carriers moving over laterally diverging tracks whereby the parisons arrive at the blow-molding unit in pockets of these carriers already separated to the extent necessary for joint introduction into the eight-cell blow mold.

U.S. Pat. No. 4,721,452 to Delfer shows an injection molding apparatus including a carrier plate cooperating with an injection molding machine and having at least two sets of cavities therein for cooling the hollow plastic articles, with the number of cavities corresponding to a multiple of at least two times the number of hollow plastic articles produced in an injection molding cycle. The apparatus also includes means for aligning one set at a time of said carrier plate cavities to juxtapose said set of cavities with the hollow plastic articles formed in an injection molding cycle, and means for transferring said hollow plastic articles to said juxtaposed cavities.

U.S. Pat. No. 4,729,732 to Schad shows an apparatus for transferring plastic parisons from a receiving station to a finishing station on a plurality of pallets in a single row for forming the parisons into hollow plastic articles. The pallets with parisons are transported through a temperature conditioning station for temperature conditioning the parisons to render them suitable for forming hollow plastic articles at the finishing station.

U.S. Pat. No. 4,836,767 to Schad et al shows an apparatus for producing molded plastic articles which is capable of simultaneously producing and cooling the plastic articles. The apparatus has a stationary mold half having at least one cavity, at least two mating mold portions, each having at least one core element, mounted to a movable carrier plate which aligns a first one of the mating mold portions with the stationary mold half and positions a second of the mating mold portions in a cooling position, a device for cooling the molded plastic article(s) when in the cooling position, and a device for moving the carrier plate along a first axis so that the aligned mold portion abuts the stationary mold half and the second mating mold portion simultaneously brings each plastic article(s) thereon into contact with the cooling device. The carrier plate is also rotatable about an axis parallel to the first axis to permit different ones of the mating mold portions to assume the aligned position during different molding cycles.

U.S. Pat. No. 5,206,039 to Valyi discloses an apparatus including a pressure molding machine for delivering plastic articles, a finishing machine for performing a finishing operation upon said articles, a conditioning section operative to adjust the temperature of said articles between the pressure molding machine and finishing machine, a first transporter adapted to remove the articles from the pressure molding machine and a second transporter adapted to transport the articles from the first transporter to the conditioning section.

U.S. Pat. No. 5,569,476 to Manen shows an apparatus for the injection molding of synthetic products, comprising a mold provided with a plurality of cavities, a discharge device and a robot device for receiving the products molded in the cavities of the mold and transferring those products to the discharge device. The robot device has at least two receiving plates, each capable of receiving a number of molded products equal to at least once the number of cavities of the mold, and a drive device for successively bringing the receiving plates into a receiving position next to the mold, and for bringing a receiving plate from the receiving position into a take-over position and back again, in which take-over position the molded products can be taken over from the mold.

U.S. Pat. No. 5,772,951 to Coxhead et al. shows an article handling and conditioning system for use between associated machines and associated processes are disclosed. The system comprises: at least one initial molding machine and a finishing machine, a device for receiving initially molded articles from the at least one initial molding machine prior to finishing in the finish machine, a first mechanism for accumulating devices for receiving and the initially molded articles, a mechanism for transporting the device for receiving and the initially molded articles from the initial molding machine to the first mechanism for accumulating, a mechanism for moving the devices for receiving and the initially molded articles through the first mechanism for accumulating and a device for transferring the initially molded articles from the first mechanism for accumulating to the finishing machine.

U.S. Pat. No. 6,139,789 to Neter et al shows a multi-stage, post-mold cooling method and apparatus used in conjunction with an injection molding machine having an aggressive cycle time and a high output. The apparatus includes a thermal conditioning device/station with cooling tubes for keeping separate the preforms of each batch and effecting cooling of the molded preforms, several separated cooling levels for simultaneously cooling multiple batches of preforms, and internal devices for automatically transferring each batch of molded preforms from one cooling level to the next. The thermal a conditioning device/station is partially sealed to create a controlled temperature environment for conditioning the molded articles.

U.S. Pat. No. 6,520,765 to von Manen et al shows an injection molding apparatus with robot device and mechanical pull-out device for removing preforms from the robot device, the robot device comprising a number of receiving tubes for preforms, the preforms being disposed in the tubes such that a collar and a screw thread portion of the neck of the bottles to be formed reach outside the receiving tubes, and the pull-out device comprising clamping elements which are positioned opposite the robot when it is in an ejection position, while first driving means for the clamping elements are provided, which can move the clamping elements towards the receiving tubes of the robot arm and away there from, respectively, and second driving means which can bring the clamping elements into a closed clamping position or an opened position, as well as control means for the first and second driving means.

U.S. Pat. No. 7,077,641 to Hirasawatsu et al. shows a preform conveying device of high production efficiency under the technical theme of aligning the plurality of preforms in single rows at high speed, while eliminating contact of individual preforms with other preforms and minimizing the chances of contact with device parts. In a state in which a plurality of preforms are aligned vertically and laterally, preforms are received in a manner partitioned in vertical row units, and by putting a conveying line, formed along the direction of a vertical row of preforms, in an inclined orientation in which the downstream side is raised, positioning the upstream end of the conveying line above a preform receiving part, and moving the vertical row unit of preforms that is positioned along the conveying line in the vertical row direction at substantially the same speed as the conveying speed of the conveying line, the respective preforms of the vertical row unit are transferred in a state in which each is sandwiched by the conveying line and this is carried out successively for each vertical row unit to supply the plurality of preforms to a blow molding machine or other subsequent process side upon aligning them in single rows.

U.S. Pat. No. 7,094,377 to Coran, et al. shows and apparatus for handling and cooling preforms, comprising a collection element provided with a plurality of receptacles arranged according to a definite geometrical distribution pattern and adapted to accommodate a corresponding plurality of preforms, as well as a cooling element. The collection element is displaceable from a preform loading position to several distinct positions, arranged above the cooling element, which is provided with a plurality of cups collected into a plurality of distinct, but similar geometrical distribution patterns that are translated with respect to each other in such a manner as to prevent them from interfering with each other. The collection element can be selectively positioned in a number of such positions as to ensure that, in each one of said positions, the geometrical distribution pattern of the receptacles comes to be placed exactly above a specific geometrical distribution pattern of the cups, so that the preforms are capable of falling from the receptacles exactly into respective cups.

US Publication 20060138696 to Weinmann shows a method and a device for the secondary treatment and the cooling of preforms once they have been removed from the open mould halves of an injection molding machine. The preforms are removed from the open moulds while still hot, by means of water-cooled cooling sleeves of a removal device, and are subjected to intensive cooling during the duration of an injection molding cycle. Both the entire inner side and the entire outer side of the blow-molded part are subjected to intensive cooling. Secondary cooling is then carried out, the duration thereof being equal to a multiple of the duration of an injection molding cycle. After being removed from the casting moulds, the preforms are dynamically introduced into the cooling sleeves until they fully touch the walls thereof. The inner cooling is carried out in a time-delayed manner.

SUMMARY

In one aspect of this invention a robot including a robot arm is used to introduce an end of arm tool (EOAT) in the molding area of an injection molding machine. The EOAT carries several removable slides, each slide holding a number of cooling devices, such as for example cooling tubes. The cooling tubes are used to retain and cool molded articles, such as PET preforms, as they are transferred by the EOAT towards a temperature conditioning station outside the molding area. The molded preforms are released from the EOAT by transferring the slides together with the cooling tubes onto the track of a conveyor that forms a temperature conditioning station. In this way the preforms are maintained in contact with the cooling tubes not only as they are moved from the molding area on to the EOAT but also after they are removed from the EOAT and for as long as they moved through various stages in the temperature conditioning station.

In another aspect of this invention, the EOAT moved into a temperature conditioning becomes part of the station.

BRIEF DESCRIPTION OF THE DRAWINGS

FIG. 1 is a schematic top view of the injection molding apparatus according to an example embodiment of the invention.

FIG. 1a is a perspective view of several injection molded preforms.

FIG. 1b is a cross sectional side view of an injection molded preform.

FIG. 2 is a front view and a side view of the movable mold plate with mold cooling cores.

FIG. 3 shows front, top and side (lateral) views of a take out plate with the slides and with cooling devices, for use with the apparatus of FIG. 1 according to an example embodiment of the invention.

FIG. 3a shows the front, top and lateral views of the take out plate with the slides and with the cooling devices according to an embodiment of the invention in which the pitch P and the spacing S are modified for a new mold that has a different layout of the mold cores and cavities.

FIG. 4 shows a top view cross section through lines C-C of FIG. 3a) identifying elements of the take out plate and the ejection plate according to an embodiment of the invention.

FIG. 4a shows a top view cross section through lines C-C of FIG. 3a) identifying elements of the take out plate and the ejection plate according to another embodiment of the invention.

FIG. 5 shows a lateral view of a temperature conditioning station and a transfer mechanism according to an embodiment of the invention. FIG. 6 shows a lateral view of the temperature conditioning station and the transfer mechanism according to another embodiment of the invention.

FIG. 7 is a lateral view of a portion of the temperature conditioning station according to an embodiment of the invention.

FIG. 8 is a lateral view of a portion of an end of arm tool and a wheel drive engaging the slides carrying cooling tubes and preforms in the temperature conditioning station.

FIG. 10 Shows synchronized motion of track driven by driving wheel (38).

FIG. 12 Shows EAOT (30) disengaged and engaged with driving belt (43)

DETAILED DESCRIPTION

Figure 9:
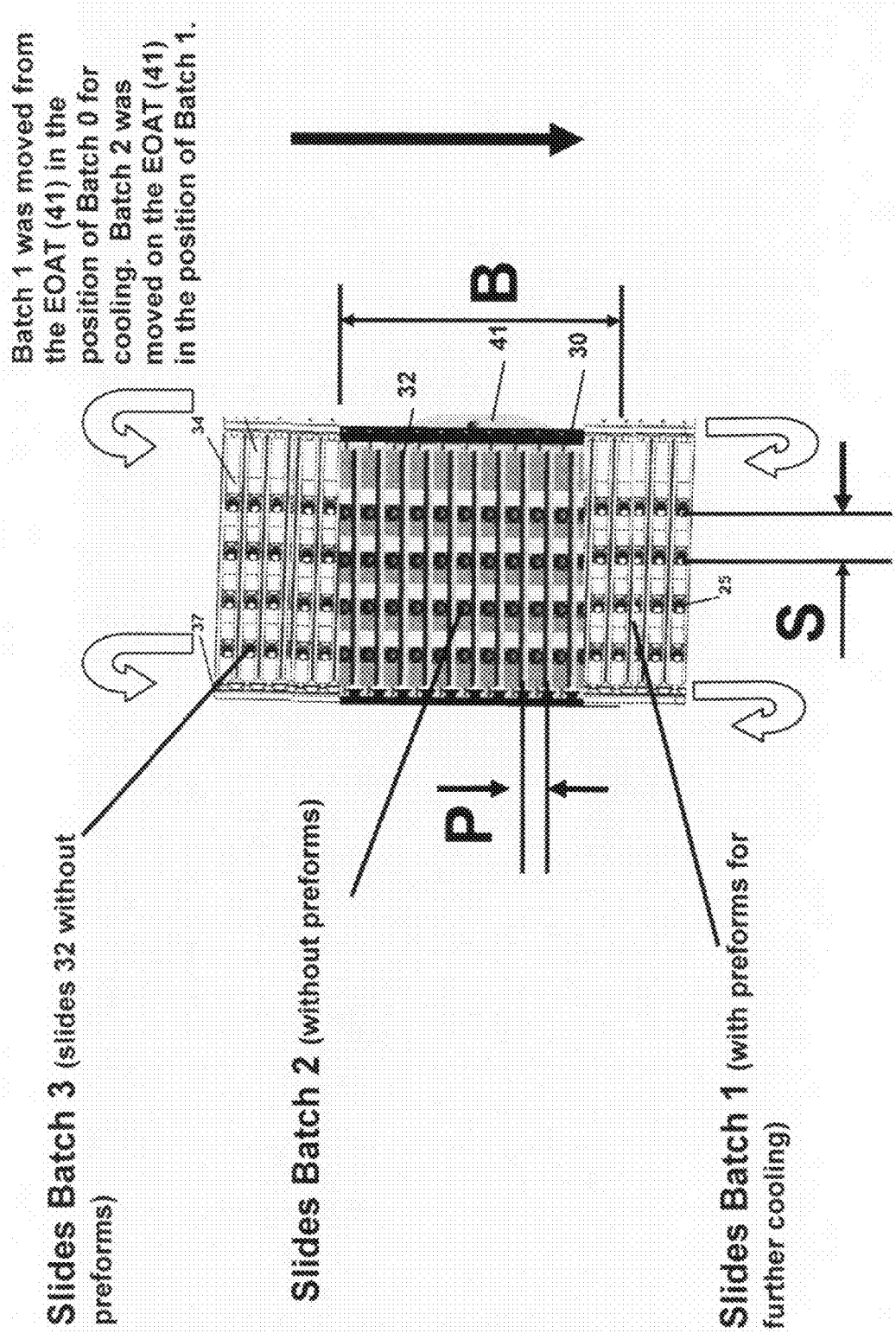
FIG. 9a) shows slides moving on the slide track conveyor. Batch 1 will be moved from the EOAT (30) in the position of Batch 0 for cooling. Batch 2 will be moved on the EOAT (30) in the position of Batch 1.
FIG. 9b) Shows Batch 1 moved from the EOAT (30) in the position of Batch 0 for cooling. Batch 2 was moved on the EOAT (30) in the position of Batch 1.
FIG. 9c) Shows the EOAT (30) with Batch 2 moved out of alignment with the slide track conveyor. Batch 1 is in the cooling stage.
FIG. 9d) Shows the EOAT (30) with Batch 2 carrying preforms is moved towards the slide track conveyor. Batch 1 is in the cooling stage.
FIG. 9e) Shows the EOAT (30) with Batch 2 carrying preforms is moved closer to the slide track conveyor. Batch 1 is in the cooling stage.
FIG. 9f) Shows the EOAT (30) with Batch 2 carrying preforms is aligned to the slide track conveyor. Batch 1 is in the cooling stage.
FIG. 9g) Shows the EOAT (30) Batch 2 with preforms conveyed along track to Batch 3 conveyed into position without preforms.
FIG. 9h) Shows Batch 3 (without preforms) on EOAT (30) transferred into molding area to receive molded parts.
Figure 9F:
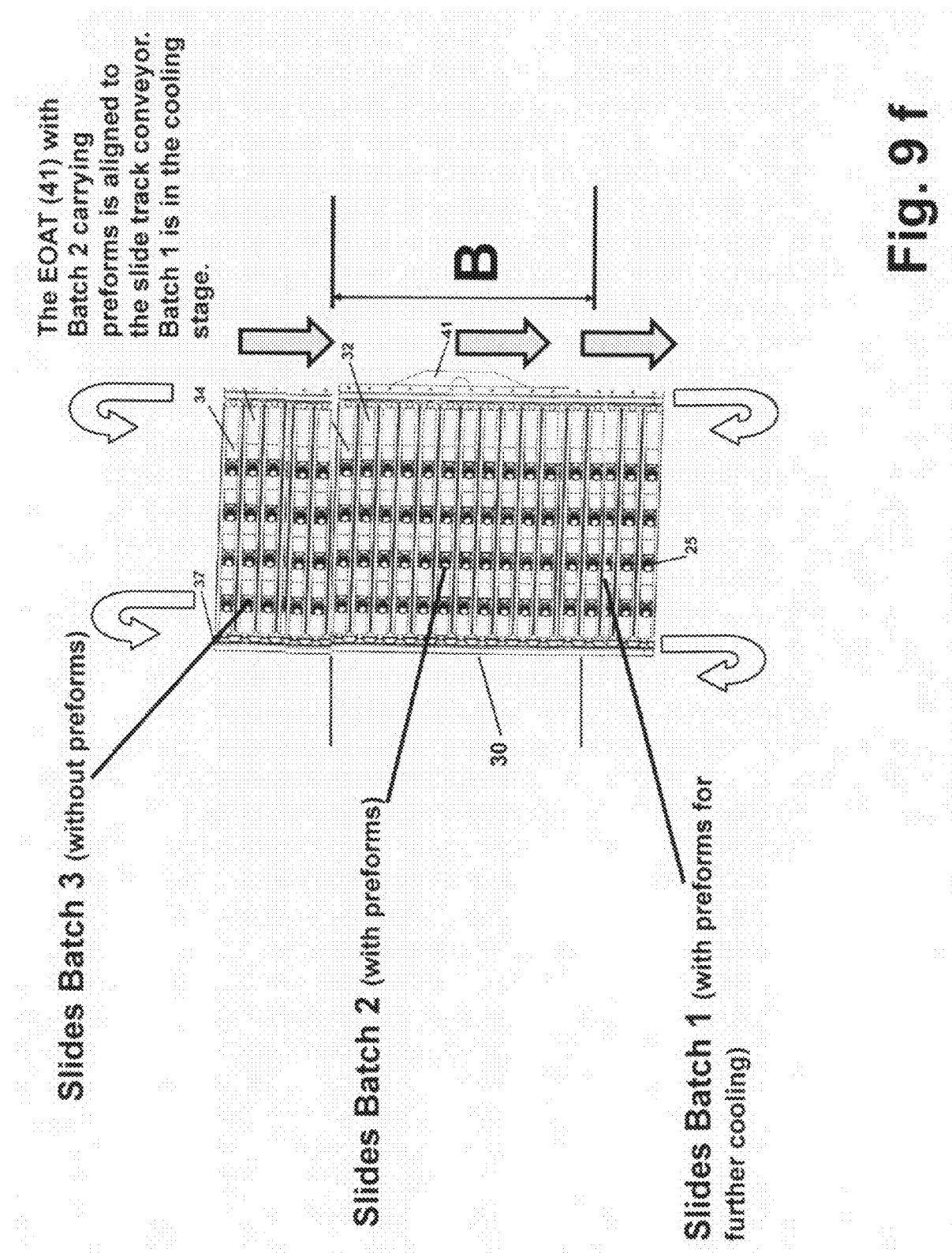
Figure 9G:
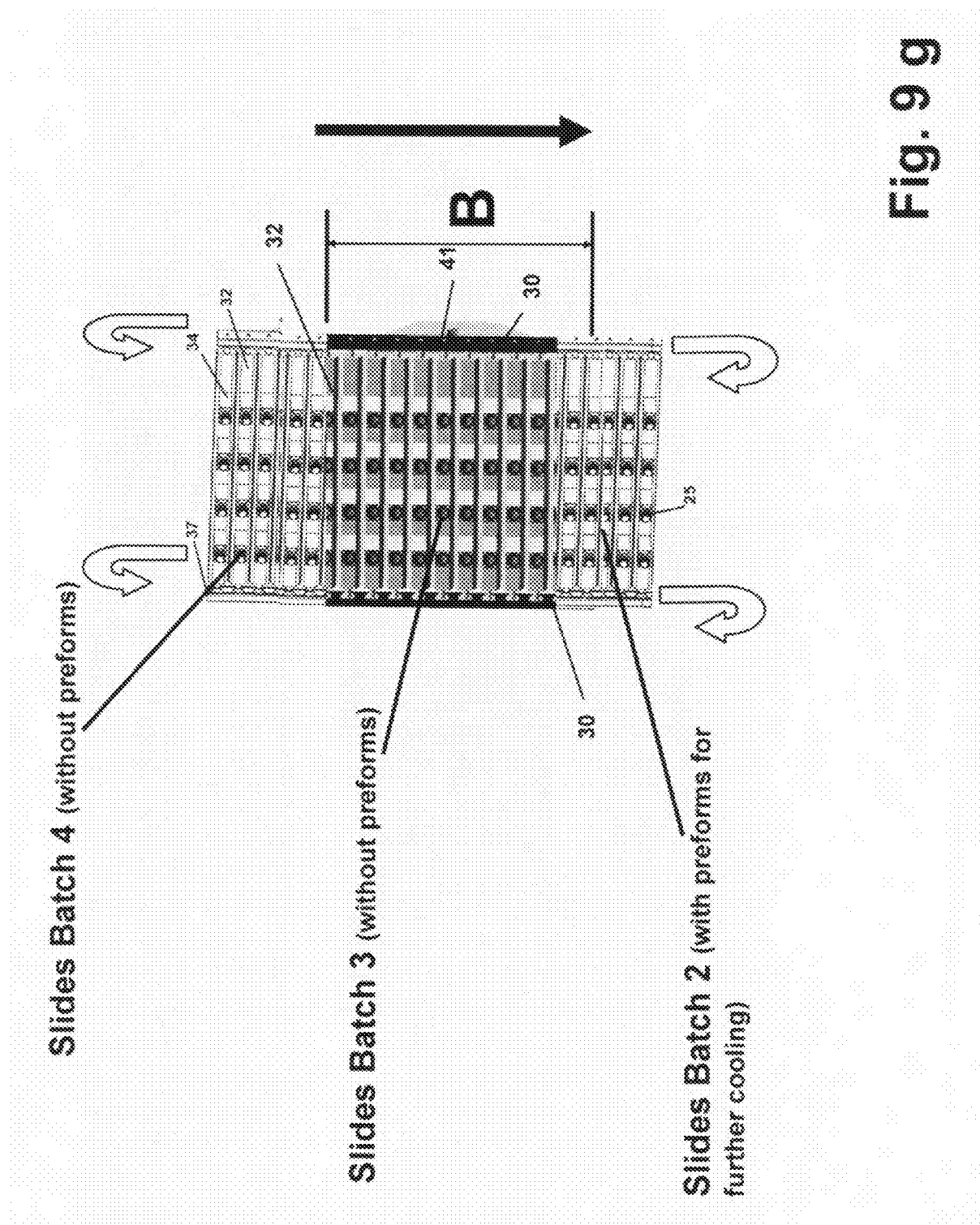
Figure 9H:
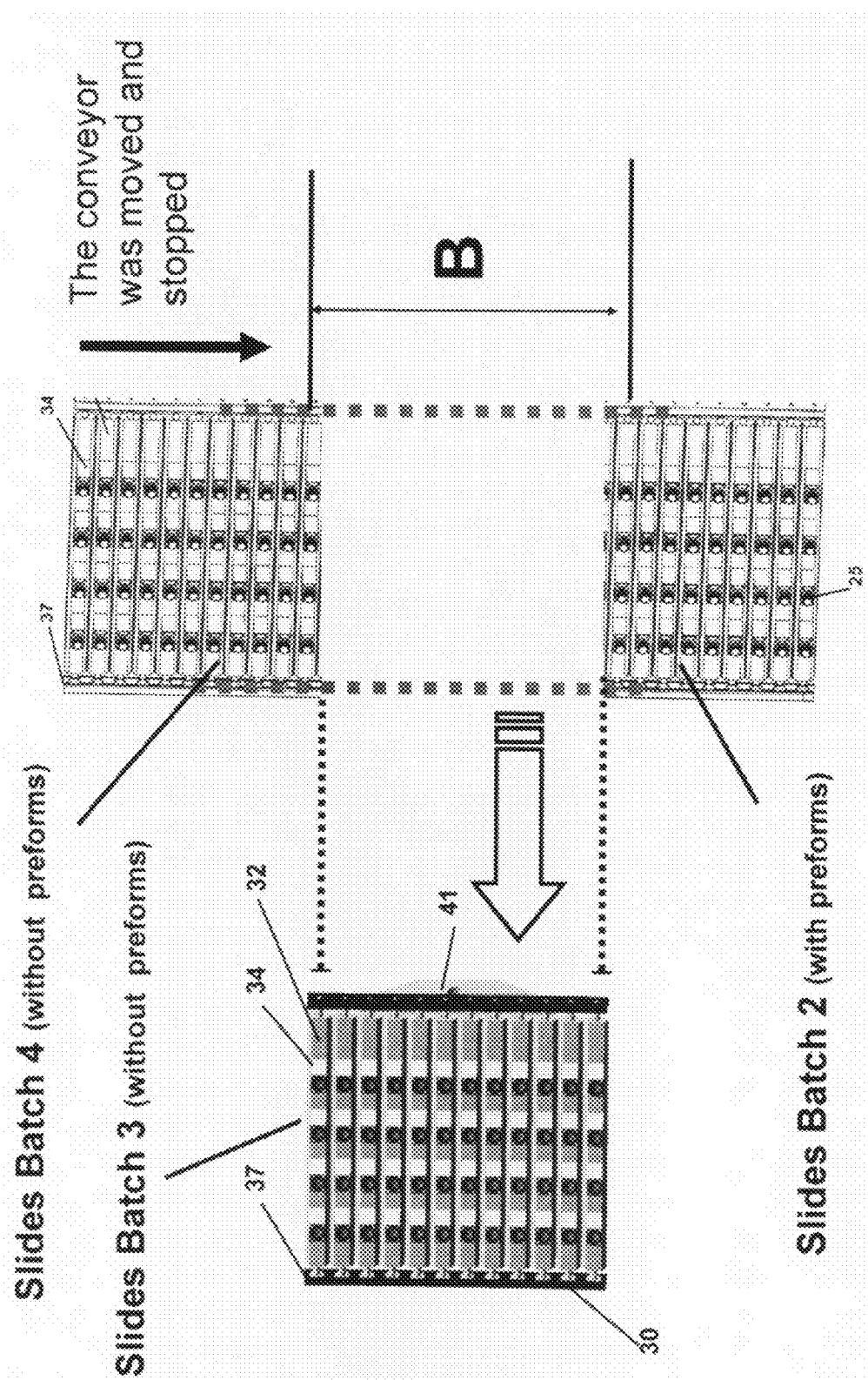
Figure 11:
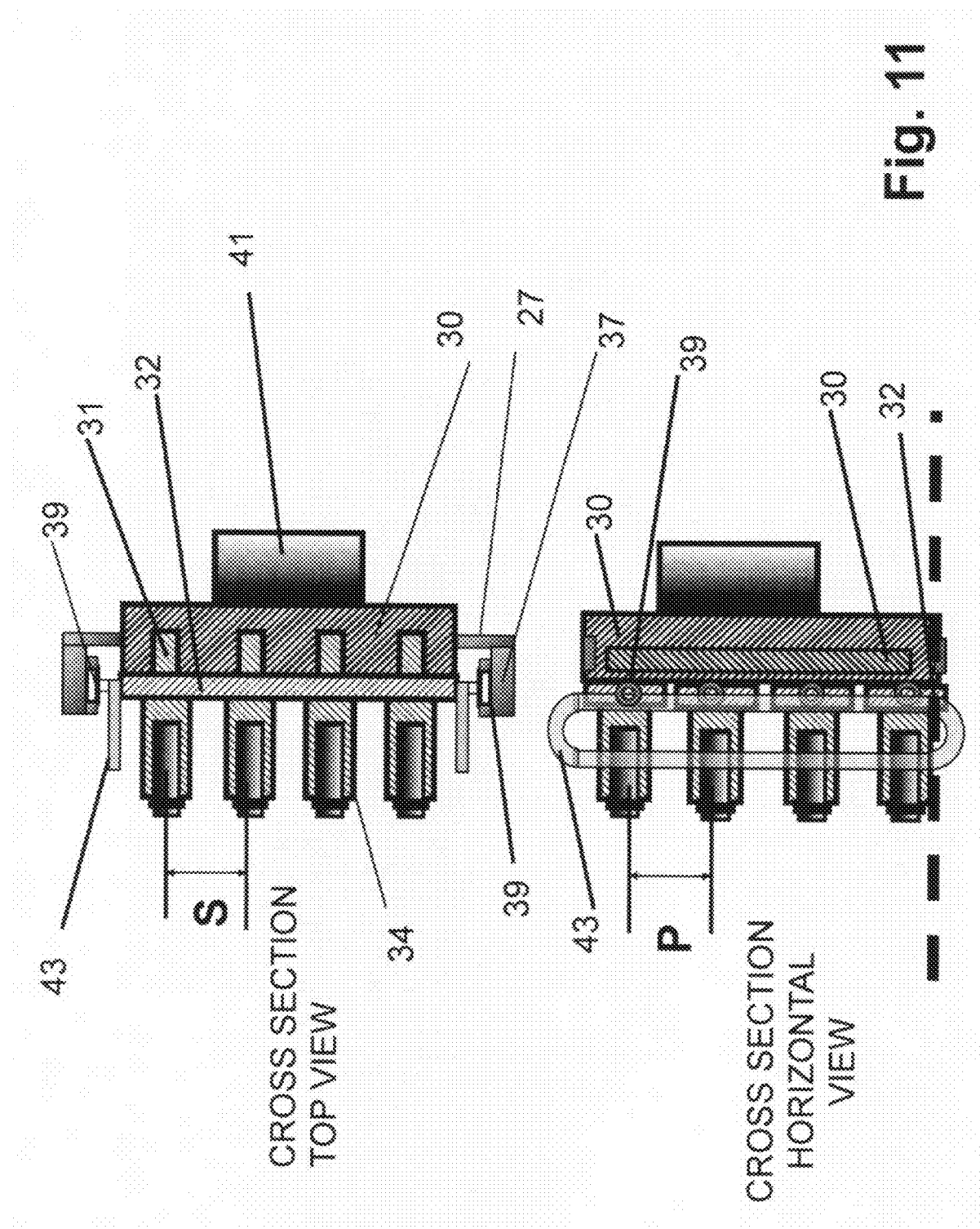
FIG. 11 Shows top and horizontal cross sectional views of EAOT (30)

In the known injection molding methods and systems, including the above referenced patents, the number of preforms that can be simultaneously injection molded in a batch, cooled during their handling, transferred from the molding area and conditioned in the temperature conditioning stations is still limited. These limitations have a detrimental impact on the output of preforms molded in any high cavitation injection mold. These limitations are in many instances related to drawbacks in the design of the known take out plates or end of arm tools (EOAT) used to automatically remove and handle freshly molded preforms. These limitations are also related to drawbacks in the design of the known temperature conditioning stations. Lastly, these limitations are related to drawbacks in the interaction between the end of arm tool (EOAT) and the temperature conditioning station.

There is a need to further optimize the injection molding process and temperature conditioning methods and equipment associated with the injection molded of hollow preforms in order to increase the output of preforms for the same number of injection molding cavities.

There is a need to speed up the process and improve the equipment for transferring and cooling the batches of molded preforms as they are moved from the injection mold and up to the subsequent stages and systems. These requirements are desirable for molded preforms, in particular PET preforms, as they are very sensitive to the processing temperature conditions along the whole injection and blow molded stages. This becomes even more desirable for large or thick wall preforms, or for coinjected, i.e. multimaterial preforms. FIG. 1. shows an example embodiment of the invention. The injection molding apparatus 1 according to this embodiment includes an injection molding machine (10) that includes an injection unit (12) that delivers a molten material, a stationary machine platen (14) and a movable machine platen (16). The movable machine platen (16) rides during its movement on four tie bars (15) that contribute to the clamping force needed to maintain the stationary and the movable machine platens in close proximity during each injection molding cycles.

In other example embodiments of the invention (not shown in a Fig.) the movable machine platen does not ride on a tie bar, or more specifically the movable and the stationary machine platens are not linked by tie bars. One type of machine like this is called a tiebarless machine.

In the apparatus of FIG. 1, an injection mold is used to receive the molten material and form batches of molded parts. The injection mold is formed of a first mold plate (18) that includes an array of mold cavities (22) and a second mold plate (20) that includes an array of mold cores (24).

In the embodiment of FIG. 1 the first mold plate (18) is attached to the stationary machine platen (14) and the second mold plate (20) is attached to the movable machine platen (16).

In another embodiment of the invention (not shown in a Fig.) a first mold plate (18) is attached to a movable machine platen (16) and a second mold plate (20) is attached to a stationary machine platen (14).

In the embodiment of FIG. 1 a molding area (26) is defined between the first mold plate (18) and the second mold plate (20). The molding area (26) is created when the movable machine platen (16) is moved away from the stationary machine platen (14). This molding area (26) is an open space used at the end of each injection molding cycle to separate the first mold plate (18) and the second mold plate (20) in order to eject batches of molded parts (25) from the mold cores (24).

The molded parts (25) can be any moldable parts. Some of these parts can be for example thin wall parts such as packaging parts. Other molded parts can be for example PET preforms for a variety of subsequent processes, such as for example for blow molding. These preforms can be molded using other resins, such as for example. These preforms can be made using not just a single material, but using two, three or more materials.

An example of such a preform made of a single material to be used for a subsequent blow molding process is shown in Fig. (FIGS. 1a and 1b.).

In another embodiment of the invention (not shown in a Fig.) a molding area (26) is used to eject batches of molded parts (25) from mold cavities (22). FOR Claims;

In the embodiment of FIG. 1 the molded parts (25) are removed from the mold cores (24) at the end of the injection and in-mold cooling steps using a mechanical and movable ejection device, such as for example a stripping or stripper plate (28). Stripper plates are known in the art. The stripper plate includes engagement means that are used to impinge the molded parts (25) from the mold cores.

The molded parts (25) are ejected from the mold cores (24) when they are sufficiently cold and rigid. In order to improve the efficiency of the injection molding process, a reduction of the cooling step done before ejecting the molded parts form the mold core will consequently reduce the cycle time and will allow for an increased number of molded part to be molded in the same period of time. This reduction of the cooling time in the mold may impact adversely the quality of molded parts (25), unless additional cooling steps are provided after the molded parts (25) are removed from the mold cores (24).

In some known cases the molded parts are dropped from the mold cores onto a conveyor that directs them to other areas and processes. In some other known cases the molded parts are transferred to a robot and then by the robot to other areas and processes. In some known cases the molded parts are cooled while being retained by the robot. In some other known cases the molded parts are cooled after being removed from the robot.

Example embodiments described herein relate to a method and apparatus that are used to provide the post mold cooling of subsequent batches of molded parts (25). According to the example embodiment of the present invention shown in FIG. 1, a robot (29) including a robot arm (33) is used to introduce an end of arm tool (30) in the molding area (26) and to move the end of arm tool (30) away from the molding area (26). The robot arm (33) is actuated by an actuation device (35). Example embodiments of the invention are not dependent on the type of the robot (29), the type of the robot arm (33) and the type of the actuation device. The robot (29), the robot arm (33) and the end of arm tool (30) are adapted to move without interfering with the machine tie bars if they exist.

According to example embodiments, the cooling device, cooling accessories and a method of cooling molded parts are adapted to be used in cooperation with movable end of arm tools, such as for example end of arm tool (30) and in cooperation with temperature conditioning devices, such as for example temperature conditioning area (40), both shown in FIG. 1.

More specifically, an embodiment of a cooling device and cooling accessories according to example embodiments of the invention are shown in FIG. 1 and in FIG. 6 and FIG. 10. Cooling device (34) is formed of a cooling device casing and a cooling cavity (36). An array of cooling devices (34) is provided with the end of arm tool (30) in order to receive a batch of molded parts (25).

Each cooling cavity (36) is adapted to receive a molded part ejected from a mold core. The cooling cavity (36) includes and provides means to cool the freshly molded part from outside. Cooling can be done via a direct contact between an outer surface of the molded part and a surface of the cooling cavity. Cooling can be also done by directing a cooling fluid, a liquid or a gas for example, towards the outer surface of the molded part.

In the case of a molded PET preform, such as a PET preform shown in FIG. 1a that is further blow molded, the post cooling step achieved by the cooling cavity is needed for several reasons, including to prevent the crystallization of any part of the preform. Some example embodiments include:
- an array of cooling devices (34), each cooling device (34) having an inner elongated cooling cavity (36) used to receive molded parts (25) ejected directly from said mold cores (24),
- at least one carrier device (32) of said cooling devices (34) where the carrier device (32) is removably connected to the end of arm tool (30),
- a linking device (37) to removably connect the carrier device (32) to the end of arm tool (30),
- a temperature conditioning station (40) separated from the robot (29) and cooperating with said robot (29) and with the end of arm tool (30), where said temperature conditioning station (40) includes a movable receiver (42) adapted to retain and transport said carrier device (32) with the molded parts (25) within the temperature conditioning station (40), and where said carrier device (32) when ejected from the end of arm tool (30) includes said cooling cavities (36) retaining said molded parts (25)

According to one example embodiment is an injection molding apparatus comprising:
- an injection molding machine (10) including an injection unit (12), a stationary machine platen (14) and a movable machine platen (16),
- an injection mold formed of a first mold plate (18) that includes an array of mold cavities (22) and a second mold plate (20) that includes an array of mold cores (24), where the first mold plate (18) is attached to the stationary machine platen (14) and the second mold plate (20) is attached to the movable machine platen (16),
- a molding area (26) defined between the first mold plate (18) and the second mold plate (20) when the movable machine platen (16) is moved away from the stationary machine platen (14) in order to eject molded parts (25) from the mold cores (24) using an ejection device (28),
- a robot (29) including a robot arm (33) movable in and out said molding area (26), where said robot (29) further includes an end of arm tool (30) attached to and movable with the robot arm (33) and where the robot arm (33) is actuated by an actuation device (35), an array of cooling devices (34), each cooling device (34) having an inner elongated cooling cavity (36) used to receive molded parts (25) ejected directly from said mold cores (24), at least one carrier device (32) of said cooling devices (34) where the carrier device (32) is removably connected to the end of arm tool (30), a linking device (37) to removably connect the carrier device (32) to the end of arm tool (30), and a temperature conditioning station (40) separated from the robot (29) and cooperating with said robot (29) and with the end of arm tool (30), where said temperature conditioning station (40) includes a movable receiver (42) adapted to retain and transport said carrier device (32) with the molded parts (25) within the temperature conditioning station (40), and where said carrier device (32) when ejected from the end of arm tool (30) includes said cooling cavities (36) retaining said molded parts (25).

Among other things, the linking device (37) can include a guiding rail (31) as shown in FIG. 4a; the linking device (37) can include a magnet (31) as shown in FIG. 4; and/or the linking device (37) can be vacuum based;

Among other things, the temperature conditioning station (40) can include a conveyor (27), which may be an open loop conveyor (27) or a closed loop conveyor (27).

In example embodiments, the temperature conditioning station (40) includes an array of cooling pins (59) that blow a cooling fluid inside the molded parts (25) retained by the cooling devices (34). In example embodiments, the temperature conditioning station (40) is linked to an injection blow molding station.

In example embodiments, the temperature conditioning station (40) includes an array of heating pins (59) that blow a hot fluid inside the molded parts (25) retained by the cooling devices (34) before said molded parts (25) are blow molded.

In example embodiments, the temperature conditioning station (40) includes a cooling area of the empty carrier devices (32) that are ready to be attached to the end of arm tool (30).

In example embodiments, the cooling cavities (36) are extruded to match the shape of the molded part. The cooling cavities (36) can be made of a high thermally conductive material.

In example embodiments, the cooling devices (34) are removably attached to the carrier devices (32).

In some example embodiments, each of said cooling devices (34) are movable along the carrier device (32) to change their spacing (45).

In some example embodiments, the carrier device (32) includes an ejection mechanism (48) for the molded parts (25) that is activated at the end of a temperature conditioning step.

In some example embodiments, the injection molding apparatus includes a controller (50) that provide operational instructions to at least two of the injection molding machine (10), the robot (29), the end of arm tool (30) and the temperature conditioning station (40), where said controller (50) provides a first signal that triggers the transfer of the carrier device (32) from the end of arm tool (30) to said movable receiver (42) and a second signal that triggers another carrier device (32) having no molded parts (25) inside the cooling devices (34) to be attached to the end of arm tool (30).

In some example embodiments, a cooling fluid is circulated around said cooling cavities.

At least some example embodiments provide a robot (29) for an injection molding apparatus (11) comprising:

a robot arm (33) movable in and out of a molding area (26) of the injection molding machine (10), said molding area being located between a movable mold plate (16) and a stationary mold plate (18), where said robot (29) further includes an end of arm tool (30) attached to and movable with the robot arm (33) and where the robot arm (41) is actuated by an actuation device (35), an array of cooling devices (34), each cooling device (34) having an inner elongated cooling cavity (36) used to receive molded parts (25) ejected directly from mold cores (24) attached to said movable mold plate (20), at least one carrier device (32) of said cooling devices (34) where the carrier device (32) is removably connected to the end of arm tool (30), and a linking device (37) to removably connect the carrier device (32) to the end of arm tool (30).

In various example embodiments of the robot for an injection molding apparatus, the linking device (37) includes a guiding rail, and/or a magnet, and/or is vacuum based.

In some example embodiments, the robot (29), the robot arm (33) and the end of arm tool (30) are operating in conjunction with the injection molding machine via a controller (69)

According to another example embodiment, there is provided an end of arm tool (30) for a robot (29) adapted to work with an injection molding machine (10) comprising:

a frame and a first connector device to attach the frame to a movable robot arm (33), a second connector device to attach means to connect said end of arm tool (30)

an array of cooling devices (34), each cooling device (34) having an inner elongated cooling cavity (36) used to receive molded parts (25) ejected directly from mold cores (24) attached to a movable mold plate (28), at least one carrier device (32) of said cooling devices (34) where the carrier device (32) is removably connected to the end of arm tool (30), and a linking device (37) to removably connect the carrier device (32) to the end of arm tool (30), According to another example embodiment is a method of cooling injection molding parts (25) comprising:

forming a first batch of injection molded parts (25) using an injection mold (11) having an array of mold cavities (22) within a stationary mold plate (20) and an array of mold cores (24) attached to a movable mold plate (20);

moving an end of arm tool (30) having an array of cooling devices (36) in between the stationary mold plate (18) and the movable mold plate (20), where each cooling device (40) includes a cooling cavity (36), where said cooling devices (36) are removably attached to at least a single carrier device (32) and where said end of arm tool (30) is attached to a movable robot arm (33);

transferring the first batch of molded parts (23) from the mold cores (24) into the cooling cavities (36) while the end of arm tool (30) is positioned in-between the stationary mold plate (14) and the movable mold plate (16);

partially cooling said molded parts (25) through direct contact between the molded parts (25) and the cooling cavities (36);

moving the robot arm (33) and the end of arm tool (30) in the proximity of a temperature conditioning station (40);

transferring said carrier device (32) with the cooling devices (34) holding molded parts (25) from the end of arm tool (30) into a first movable receiver device associated with the temperature conditioning station (40);

further cooling said molded parts (25) retained by the cooling devices (34) in the temperature conditioning station (40) while transferring other cooling devices (34) having empty cooling cavities (36) from a second movable receiver device into the end of arm tool (30), moving the end of arm tool (30) back in between the stationary mold plate (14) and the movable mold plate (16), and transferring a second batch of molded parts (25) from the mold cores (20) into the cooling devices (40) while the first batch of molded articles is further cooled in the temperature conditioning station (40);

According to another example embodiment is an injection molding apparatus comprising:

an injection molding machine (10);

an injection mold (18) associated with the injection molding machine (10), where the mold is formed of a movable mold plate (20) having mold cores (24) and a stationary mold plate (18) having mold cavities (22), where said movable and stationary mold plates define a molding area (26) when the mold stationary plate and the mold movable plate are separated at the end of an injection molding cycle;

an end of arm tool (30) movable between a first position in the molding area in alignment with the mold cores and a second position outside the molding area and in alignment with a transfer device (28);

a plurality of removable slides (32) attached to the end of arm tool (30), where each slide houses a plurality of cooling cavities (34) and where the slides and the cooling cavities are able to retain a first batch of hollow molded articles;

a connecting device (31) secured to the end of arm tool (30) that retains the removable slides (32) and the cooling cavities (30) to the end of arm tool; and a controller (60) that coordinates the movement of the end of arm tool (30) and the transfer of the removable slides (32) from the end of arm tool (30) when the end of arm tool is in alignment with the transfer device.

In at least some example embodiments, the slides comprise a temperature conditioning station (40) including a slide track conveyor (37) adapted to cooperate with said end of arm tool to receive said first plurality of slides and cooling tubes holding the first batch of molded articles and where said slide track conveyor is further used to guide the first plurality of slides with preforms into a cooling area of the slide track conveyor while transferring onto the take out plate a second plurality of slides and empty cooling tubes that are adapted to receive a second batch of molded articles when the take out plate is moved back in the molding area.

According to another example embodiment is a robot apparatus for removing molded parts from an injection molding machine comprising:

a movable robot arm;

an actuator connected to the robot arm;

an end of arm tool (30) having a frame (27) and an anchor (31)

a plurality of removable slides (32) attached to the frame (30), where each slide houses a plurality of cooling cavities (34) and where the slides and the cooling cavities are able to retain a first batch of hallow molded articles.

What is claimed is:

1. An injection molding apparatus comprising:

an injection molding machine (10) including an injection unit (12), a stationary machine platen (14) and a movable machine platen (16), an injection mold formed of a first mold plate (18) that includes an array of mold cavities (22) and a second mold plate (20) that includes an array of mold cores (24), where the first mold plate (18) is attached to the stationary machine platen (14) and the second mold plate (20) is attached to the movable machine platen (16), a molding area (26) defined between the first mold plate (18) and the second mold plate (20) when the movable machine platen (16) is moved away from the stationary machine platen (14) in order to eject molded parts (25) from the mold cores (24) using an ejection device (28), a robot (29) including a robot arm (33) movable in and out said molding area (26), where said robot (29) further includes an end of arm tool (30) attached to and movable with the robot arm (33) and where the robot arm (33) is actuated by an actuation device (35), an array of cooling devices (34), each cooling device (34) having an inner elongated cooling cavity (36) used to receive molded parts (25) ejected directly from said mold cores (24), at least one carrier device (32) of said cooling devices (34) where the carrier device (32) is removably connected to the end of arm tool (30), a linking device (37) to removably connect the carrier device (32) to the end of arm tool (30), a temperature conditioning station (40) separated from the robot (29) and cooperating with said robot (29) and with the end of arm tool (30), where said temperature conditioning station (40) includes a movable receiver (37) adapted to retain and transport said carrier device (32) with the molded parts (25) within the temperature conditioning station (40), and where said carrier device (32) when ejected from the end of arm tool (30) includes said cooling cavities (36) retaining said molded parts (25).

2. An injection molding apparatus according to claim 1 where said linking device (37) is a guiding rail (31).

3. An injection molding apparatus according to claim 1 where said linking device (37) is a magnet (31).

4. An injection molding apparatus according to claim 1 where said linking device (37) is vacuum based.

5. An injection molding apparatus according to claim 1 where said temperature conditioning station (40) includes a conveyor (27).

6. An injection molding apparatus according to claim 1 where said temperature conditioning station (40) includes an open loop conveyor (27).

7. An injection molding apparatus according to claim 1 where said temperature conditioning station (40) includes a closed loop conveyor (27).

8. An injection molding apparatus according to claim 1 where said temperature conditioning station (40) includes an array of cooling pins (59) that blow a cooling fluid inside the molded parts (25) retained by the cooling devices (34).

9. An injection molding apparatus according to claim 1 where said temperature conditioning station (40) is linked to an injection blow molding station.

10. An injection molding apparatus according to claim 1 where said temperature conditioning station (40) includes an array of heating pins (59) that blow a hot fluid inside the molded parts (25) retained by the cooling devices (34) before said molded parts (25) are blow molded.

11. An injection molding apparatus according to claim 1 where said temperature conditioning station (40) includes a cooling area of the empty carrier devices (32) that are ready to be attached to the end of arm tool (30).

12. An injection molding apparatus according to claim 1 where said cooling cavities (36) are extruded to match the shape of the molded part.

13. An injection molding apparatus according to claim 1 where said cooling cavities (36) are made of a high thermally conductive material.

14. An injection molding apparatus according to claim 1 where each of said cooling devices (34) are removably attached to the carrier devices (32).

15. An injection molding apparatus according to claim 1 where each of said cooling devices (34) is movable along the carrier device (32) to change their spacing.

16. An injection molding apparatus according to claim 1 where the carrier device (32) includes an ejection mechanism (48) of the molded parts (25) that is activated at the end of the temperature conditioning step.

17. An injection molding apparatus according to claim 1 further comprising a controller (60) that provide operational instructions to at least two of the injection molding machine (10), the robot (29), the end of arm tool (30) and the temperature conditioning station (40), where said controller (60) provides a first signal that triggers the transfer of the carrier device (32) from the end of arm tool (30) to said movable receiver (42) and a second signal that triggers another carrier device (32) having no molded parts (25) inside the cooling devices (34) to be attached to the end of arm tool (30).

18. An injection molding apparatus according to claim 1 that the carrier device (32) is removably connected to the end of arm tool (30) via said linking device (37) and thus said carrier device (32) can be transferred from the end of arm tool (30) to the movable receiver (42) and from the movable receiver (42) to the end of arm tool (30).

19. An injection molding apparatus according to claim 1 adapted to retain and transport said carrier device (32) with the molded parts (25) within the temperature conditioning station (40), and where said carrier device (32) when ejected from the end of arm tool (30) includes said cooling cavities (36) retaining said molded parts (25).

20. An injection molding apparatus according to claim 1 where a plurality of removable slides (32) attached to the frame (30), where each slide houses a plurality of cooling cavities (34) and where the slides and the cooling cavities are able to retain said molded parts (25).

* * * * *